(12) United States Patent
Robinson et al.

(10) Patent No.: US 9,272,276 B2
(45) Date of Patent: Mar. 1, 2016

(54) IN-SITU CATALYST SULFIDING, PASSIVATING AND COKING SYSTEMS AND METHODS

(71) Applicant: REACTOR RESOURCES, LLC, Alvin, TX (US)

(72) Inventors: James Maxie Robinson, Friendswood, TX (US); James Michael Robinson, Friendswood, TX (US)

(*) Notice: Subject to any disclaimer, the term of this patent is extended or adjusted under 35 U.S.C. 154(b) by 0 days.

(21) Appl. No.: 14/530,652

(22) Filed: Oct. 31, 2014

(65) Prior Publication Data

US 2015/0056101 A1    Feb. 26, 2015

Related U.S. Application Data

(63) Continuation-in-part of application No. 14/212,319, filed on Mar. 14, 2014.

(60) Provisional application No. 61/962,101, filed on Oct. 31, 2013, provisional application No. 61/852,396, filed on Mar. 15, 2013.

(51) Int. Cl.
*B01J 37/20* (2006.01)
*B01J 8/00* (2006.01)

(52) U.S. Cl.
CPC *B01J 37/20* (2013.01); *B01J 8/001* (2013.01); *B01J 2208/0007* (2013.01); *B01J 2208/00044* (2013.01); *B01J 2208/00061* (2013.01); *B01J 2208/00088* (2013.01); *B01J 2208/00539* (2013.01); *B01J 2208/00592* (2013.01); *B01J 2208/00628* (2013.01)

(58) Field of Classification Search
CPC .................................................. B01J 8/001
See application file for complete search history.

(56) References Cited

U.S. PATENT DOCUMENTS 3,166,491 A * 1/1965 Harvey .................. B01J 23/70
                                                    208/111.35
6,503,864 B2   1/2003 Loescher et al.

FOREIGN PATENT DOCUMENTS

FR          2 668 951     5/1992
WO         2010/072836    7/2010

OTHER PUBLICATIONS

Baharlou, S., International Preliminary Report on Patentability for International Patent Application No. PCT/US2014/028275, dated Sep. 15, 2015, the International Bureau of WIPO.
L. Reed, Phillips Petroleum Company, "The Effects of Sulfur Compounds and Phillips Antifoulants in Ethane Pyrolysis", Symposium on Coke Formation and Mitigation, Aug. 20-25, 1995.

(Continued)

*Primary Examiner* — Lessanework Seifu
(74) *Attorney, Agent, or Firm* — Sutton McAughan Deaver PLLC

(57) ABSTRACT

A system and method for efficiently treating metal catalyst resident in a reactor vessel comprises a sulfiding module, a sulfur source, an ammonia source, and/or a coking source, a hydrogen sulfide detection module, a hydrogen gas detection module, a pH detection module, an ammonia gas detection module and a remote computer all arranged and configured to communicate wirelessly and to allow remote control and monitoring of the modules and process so that catalyst may be sulfided, passivated and/or soft-coked in situ.

20 Claims, 12 Drawing Sheets

(56) References Cited

OTHER PUBLICATIONS

Criterion Catalysts, "*Criterion* Hydrotreating Catalyst In-Situ Presulphiding Guidelines—Liquid Phase—Gas Phase", Technical Bulletin, [retrieved from the internet on Sep. 25, 2014 using <URL: http://s05.static-shell.com/content/dam/shell/static/criterion/downloads/pdf/pre-sulf.pdf>].

Gaylord Chemical Company, L.L.C., "An Overview of Catalyst Sulfiding", Product Information Bulletin—DMS and DMSO Dimethyl sulfide and dimethyl sulfoxide as sulfur sources in catalyst presulfiding, Bulleting # 205B, Oct. 2007.

Alexander, R., Jardin, F., and Dufresne, P., "Sulfiding Solutions", [retrieved from the internet on Sep. 25, 2014 using <URL: http://www.eurecat.fr/eurecat/gb/technical_doc/Y509%20Hydrocarbon%20Engineering%20Sept%202005.pdf>].

Criterion Catalysts & Technologies, "CENTERA Catalyst Liquid Feed with Sulfiding Agent", Catalyst Activation Guidelines, revision 5, dated Feb. 2, 2010.

Zuurdeeg, B., International Search Report for International Patent Application No. PCT/US2014/028275, European Patent Office, dated Jun. 25, 2014.

Zuurdeeg, B., Written Opinion for International Patent Application No. PCT/US2014/028275, European Patent Office, dated Jun. 25, 2014.

Hallie, H., "Experience reveals best presulfiding techniques for HDS and HDN catalysts", Oil and Gas Journal, dated Dec. 20, 1982, pp. 69-74.

Arkema, "Arkema's Dimethyl Disulfide-Evolution and ISO Certified Carelflex Service", "Worry-Free and Safe" Activation of Hydroprocessing Catalysts, Oil Gas European Magazine, vol. 33, No. 4, Dec. 2007.

Arkema, "Carelflex—New High Pressure Pumps for DMDS & Amine Injection", brochure, retrieved from the internet on Jun. 10, 2014 using <URL: http://www.arkema.com/export/shared/.content/media/downloads/products-documentations/thiochemicals/carelflex-brochure.pdf>.

Zuurdeeg, B., International Search Report for International Patent Application No. PCT/US2014/063593, dated Feb. 3, 2015, European Patent Office.

Zuurdeeg, B., Written Opinion for International Patent Application No. PCT/US2014/063593, dated Feb. 3, 2015, European Patent Office.

\* cited by examiner

IN-SITU CATALYST SULFIDING, PASSIVATING AND COKING SYSTEMS AND METHODS

CROSS REFERENCE TO RELATED APPLICATIONS

This application claims benefit of and priority to U.S. Provisional Application Ser. No. 61/962,101, filed on Oct. 31, 2013, and U.S. Provisional Application Ser. No. 61/852,396, filed on Mar. 15, 2013, the entire contents of which are incorporated herein for all purposes.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to methods and apparatuses for sulfiding, passivating and/or coking a hydrocarbon processing catalyst; and more specifically to methods and apparatuses for sulfiding, passivating and/or coking a hydrocarbon processing catalyst resident in a reactor.

2. Description of the Related Art

Hydroprocessing units, such as, but not limited to, hydrotreaters, hydrodesulfurizers and hydrocrackers, found in hydrocarbon refineries utilize metal sulfide catalysts to aid the chemical reactions. For example, and in general, hydrotreating processes use catalysts built on a γ-alumina substrate, and hydrocracking processes use catalysts with an alumina silicate substrate, which exhibit an acid function to aid in cracking the heavy hydrocarbons. These catalysts require periodic sulfiding to reach maximum catalytic activity. For purposes of this disclosure, "sulfiding" means converting a metal oxide on a catalyst to its metal sulfide.

There are several ways to sulfide catalyst already packed in a reactor vessel, commonly referred to as in-situ sulfiding, such as by using the naturally occurring sulfur in the hydrocarbon feed stock (aka sour feed). While beneficially avoiding the cost of an independent source of sulfur, using feedstock sulfur can be time consuming and potentially harmful if the sulfur content is not carefully monitored or high enough. An alternative to using feedstock sulfur is to use an independent sulfur source, such as, but not limited to, mercaptans, sulphides, disulphides, polysulphides and sulfoxides, such as Dimethyl Disulfide (DMDS), Dimethyl Sulfide (DMS), Dimethyl Sulfoxide (DMSO), di-tertiary-butyl polysulfide (TBPS), tertiary nonylpolysulfide (TNPS) and refinery acid gas. These sulfur sources can be used to perform in-situ liquid phase sulfiding or in-situ gas phase sulfiding.

In general, within the hydroprocessing unit, sulfur is reacted with hydrogen to form hydrogen sulfide ($H_2S$). The metal oxide catalysts are reacted with hydrogen sulfide ($H_2S$) and hydrogen ($H_2$) at elevated temperatures to form the active metal sulfide, such as $MoS_2$, $Co_9S_8$, $WS_2$ or $Ni_3S_2$, in an exothermic reaction. Theoretically, only the stoichiometric amount of sulfur is needed to activate (i.e., sulfide) the catalyst. However, in the real world of commercial refineries, it is common to use more than the stoichiometric amount of sulfur to ensure complete activation. However, using excess sulfur creates excess hydrogen sulfide and other sulfiding products that must be disposed of or otherwise dealt with.

Liquid DMDS is often used as the sulfur source because of its high sulfur density by weight (compared to the other potential sulfur sources) and lack of solid or overly reactive decomposition products, which absence reduces coking. DMDS can be injected into the hydrocarbon feed stream as a liquid or into the hydrogen recycle loop as a gas. Under temperature and pressure, DMDS will decompose into $H_2S$ at several temperature ranges including about 350° F. to about 450° F.; about 390° F. to about 500° F. and about 450° F. to about 520° F.

Once the catalyst has been activated by converting the metal oxide to the metal sulfide form of the catalyst, the reactor usually must undergo a typically lengthy (e.g., several days) start-up procedure before the reactor can be returned to commercial or steady state operation. This start-up procedure is typically necessary because freshly sulfided catalysts may be overly reactive and using a reactive feed (e.g., cracked feed) at start up may cause fouling of the catalyst surface by formation of heavy cokes and gums. These fouling deposits may adversely limit the available active surface area and otherwise reduce the catalyst activity. Delaying the supply of cracked feeds to the unit during start-up by running first on a less reactive feed (primarily obtained through fractionation rather than cracking), usually referred to as "straight run" feed, allows these areas of high catalyst activity to moderate, thus minimizing adverse coke and gum formation when cracked feeds are introduced.

Typically, during start-up, straight run feed (in contrast to cracked feed) is supplied to the reactor. During this period, an amount of soft coke may form on the catalyst surface, which tempers or moderates the activity of the catalyst. Once catalyst activity has been passivated, cracked feeds can be fed to the reactor with reduced risk of adverse coke and gum formation.

The inventions disclosed and taught herein are directed to methods and apparatuses for efficiently sulfiding, sulfiding and passivating, sulfiding and coking, and/or sulfiding, passivating and coking catalysts packed in a reactor vessel.

BRIEF SUMMARY OF THE INVENTION

As a brief summary of one aspect of the inventions disclosed in this application for patent, a system is provided for sulfiding hydroprocessing catalyst resident in the hydroprocessing reactor. The system comprises a sulfiding module configured to measure inject a desired amount and rate of sulfiding product into the reactor and to monitor the properties of the reactor, the reactants and the products to determine when the catalyst has been sufficiently sulfided. The system also provides for the injection of a nitrogen-bearing product configured to react and produce ammonia, which can then react with and neutralize highly acidic catalysts sites. The system is configured to monitor the properties of the reactor, the reactants and the products to determine when the catalyst has been sufficiently passivated, such as by monitoring the pH of produced water or the amount of ammonia in a gas recycle line.

As a brief summary of another aspect of the inventions disclosed in this application for patent, a system is provided for sulfiding hydroprocessing catalyst resident in the hydroprocessing reactor. The system comprises a sulfiding module configured to measure inject a desired amount and rate of sulfiding product into the reactor and to monitor the properties of the reactor, the reactants and the products to determine when the catalyst has been sufficiently sulfided. The system also provides the injection of a coking product configured to react and produce a layer of coke on at least some of the catalyst, such as catalyst adjacent the inlet. The system is configured to monitor the properties of the reactor, the reactants and the products to determine when the catalyst has been sufficiently coked, such as by monitoring the temperature profile of a catalyst bed or a portion of a catalyst bed.

As a brief summary of yet another aspect of the inventions disclosed in this application for patent, a system is provided for sulfiding hydroprocessing catalyst resident in the hydroprocessing reactor. The system comprises a sulfiding module configured to measure inject a desired amount and rate of sulfiding product into the reactor and to monitor the properties of the reactor, the reactants and the products to determine when the catalyst has been sufficiently sulfided. The system also provides for the injection of a nitrogen-bearing product configured to react and produce ammonia, which can then react with and neutralize highly acidic catalysts sites. The system is configured to monitor the properties of the reactor, the reactants and the products to determine when the catalyst has been sufficiently passivated, such as by monitoring the pH of produced water or the amount of ammonia in a gas recycle line. The system also provides the injection of a coking product configured to react and produce a layer of coke on at least some of the catalyst, such as catalyst adjacent the inlet. The system is configured to monitor the properties of the reactor, the reactants and the products to determine when the catalyst has been sufficiently coked, such as by monitoring the temperature profile of a catalyst bed or a portion of a catalyst bed.

As a brief summary of another aspect of the inventions disclosed in this application for patent, a system is provided for varying the reactivity of a straight run start-up feed by injecting into the feed a controllable amount of a coking product configured to react and produce a layer of coke on at least some of the catalyst, such as catalyst adjacent the inlet. The system is configured to monitor the properties of the reactor, the reactants and the products to determine when the catalyst has been sufficiently coked, such as by monitoring the temperature profile of a catalyst bed or a portion of a catalyst bed.

BRIEF DESCRIPTION OF THE SEVERAL VIEWS OF THE DRAWINGS

The following figures form part of the present specification and are included to demonstrate further certain aspects of the present invention. The invention may be better understood by reference to one or more of these figures in combination with the detailed description of specific embodiments presented herein.

Figure 1:
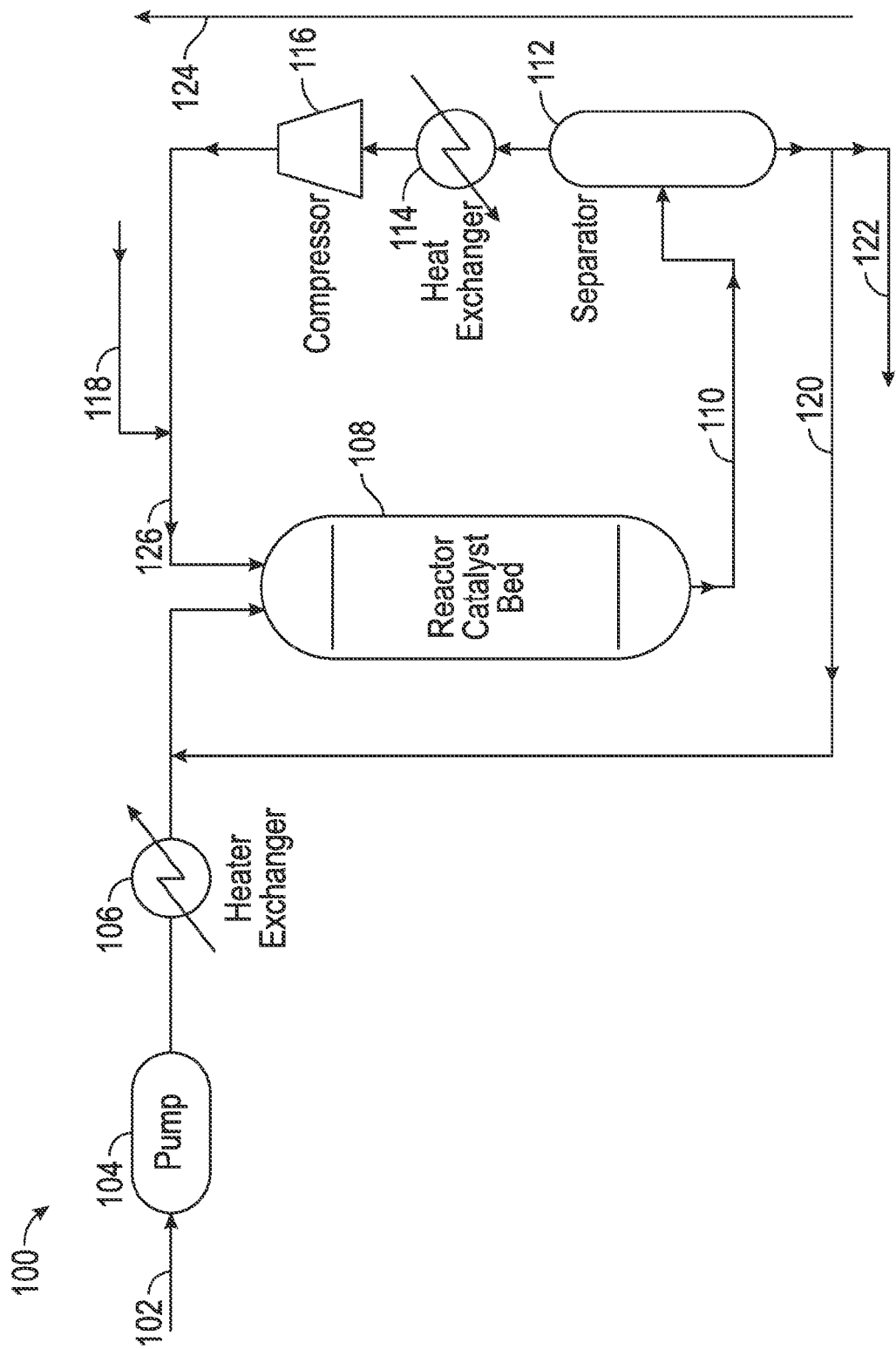
FIG. 1 illustrates an exemplary hydroprocessing unit to which the present inventions may be implemented.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Particular embodiments of the invention may be described below with reference to block diagrams and/or operational illustrations of methods. It will be understood that each block of the block diagrams and/or operational illustrations, and combinations of blocks in the block diagrams and/or operational illustrations, can be implemented by analog and/or digital hardware, and/or computer program instructions. Such computer program instructions may be provided to a processor of a general-purpose computer, special purpose computer, ASIC, and/or other programmable data processing system. The executed instructions may create structures and functions for implementing the actions specified in the block diagrams and/or operational illustrations. In some alternate implementations, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

In general terms, we have invented systems and processes for efficiently and controllable sulfiding catalyst resident in a reactor vessel through measurement, control, and continuous real time reporting of reactants and operational parameters. Our systems and methods may comprise a front-end sulfur supply system, or a front-end sulfur and nitrogen supply system, or a front-end sulfur and carbon supply system, or a front end sulfur, nitrogen and carbon supply system; and a process detection system.

A sulfur supply system may be configured to provide a sulfur source, such as, but not limited to, liquid dimethyl disulfide (DMDS) using a controlled and controllable pump, a fluid property measurement device, such as a Coriolis flow measurement instrument, and a data transmission component. A hydrogen sulfide detection system may be provided and comprise a real-time or quasi-real-time $H_2S$ detection component and a data transmission component. A hydrogen gas detection component may be provided and comprise a real-time or quasi-real-time $H_2$ detection device and a transmission component, which may be the same transmission component as the used by the hydrogen sulfide detection system. A water detection component may be provided and may comprise a real-time or quasi-real-time water detection device and a transmission component.

A sulfur and ammonia supply system may be configured to provide a sulfur source, such as, but not limited to, liquid dimethyl disulfide (DMDS) using a controlled and controllable pump, a nitrogen source, such as, but not limited to aqueous ammonia ($NH_3$ (aq)), anhydrous ammonia ($NH_3$), aniline ($C_6H_5NH_2$), amines, amides or other organic nitrogen compounds that will undergo hydrodenitrogenation to form ammonia ($NH_3$) during the sulfiding process, a mixing or metering component to selectively vary the ratio of the sulfur source and the ammonia source, a fluid property measurement device, such as a Coriolis flow measurement instrument, and a data transmission component. A hydrogen sulfide detection system may be provided and comprise a real-time or quasi-real-time $H_2S$ detection component and a data transmission component. A hydrogen gas detection component may be provided and comprise a real-time or quasi-real-time $H_2$ detection device and a transmission component, which may be the same transmission component as the used by the hydrogen sulfide detection system. A water detection component may be provided and comprise a real-time or quasi-real-time water detection device and a transmission component. A pH detection component may be provided to transduce and communicate the pH of water generated by the system and method. An ammonia ($NH_3$) detection component may be provided to detect the presence and/or amount of ammonia available in the system and method.

A sulfur and coking supply system may be configured to provide a sulfur source, such as, but not limited to, liquid dimethyl disulfide (DMDS) using a controlled and controllable pump, a carbon source, such as but not limited to linear alkylbenzenes, polycyclic aromatic compounds, such as, but not limited to anthracene, naphthalene, or pyrene, and other substantially unsaturated hydrocarbons useful for generating coke at the sulfiding condition discussed above, a mixing or metering component to selectively vary the ratio of the sulfur source and the carbon source, a fluid property measurement device, such as a Coriolis flow measurement instrument, and a data transmission component. A hydrogen sulfide detection system may be provided and comprise a real-time or quasi-real-time $H_2S$ detection component and a data transmission component. A hydrogen gas detection component may be provided and comprise a real-time or quasi-real-time $H_2$ detection device and a transmission component, which may be the same transmission component as the used by the hydrogen sulfide detection system. A water detection component may be provided and comprise a real-time or quasi-real-time water detection device and a transmission component.

In a preferred, but non-limiting embodiment, a sulfiding system comprises a sulfur and ammonia, sulfur and coking or a sulfur, ammonia and coking supply system, a hydrogen sulfide detection system, a hydrogen gas detection system a water and water pH detection system, and an ammonia gas detection system transmit data wirelessly to one or more computers for data display and/or system control, and/or the Internet for distribution to others for display and/or system control. By collecting and processing data from the sulfiding system, the hydrogen sulfide detection system, the hydrogen gas detection system, the water detection system, the water pH detection system and/or the ammonia detection system, the apparatuses and methods of our inventions efficiently and effectively control and/or reduce the amount of sulfur consumed in the sulfiding process; efficiently and effectively reduce the amount of unwanted or unneeded $H_2S$ generated; efficiently and effectively reduce the amount of sulfur oxides that are introduced into the atmosphere by flaring unwanted $H_2S$, and other sulfiding byproducts, efficiently passivates the acidic catalyst sites and/or efficiently moderates the catalyst activity by soft-coking the catalyst.

Turning now to the figures, FIG. 1 illustrates in general fashion a hydroprocessing system 100, comprising a process inlet through which hydrocarbon feedstock 102 may enter the system 100. A pump or other pressurizing device 104 may be used to introduce the feedstock 102 into the system 100. A heat exchanger 106, such as a furnace, may be used as needed to heat the feedstock 102 to the appropriate temperature range for the chemical processes involved in system 100. Heated feedstock 102 may be introduced to a reactor vessel 108 for primary chemical processing. Reactor vessel 108 typically contains a metal catalyst or a plurality of catalysts designed to increase the efficiency of the chemical reaction therein. Reactor products 110 may be fed to a separator 112 where the reactor products 110 are separated into, for example, their liquid and gas phases. The gas phase may be passed through another heat exchanger 114 to extract heat and thereby cool the gas so that it may be compressed 116 and returned to the reactor vessel 108. A hydrogen gas makeup line 118 may be used to add hydrogen ($H_2$) gas to the process as needed. Liquid components of the reactor products can be recirculated through line 120 to the input to reactor vessel 108. The ultimate or final product 122 of the system 100 may be extracted from the system 100 as shown. Waste or undesired products also can be extracted. Also illustrated in FIG. 1 is a low-pressure flare line 124 for combusting reaction products, waste products and other materials, as needed and allowed.

It will be appreciated that FIG. 1 illustrates at a very high level the basic components of a catalyst-based hydroprocessing system 100. FIG. 1 is not intended to be a complete or actual hydroprocessing system. It will also be appreciated that catalyst-based hydrocarbon processing systems such as illustrated in FIG. 1 typically require that the metal catalyst periodically be re-charged or regenerated to maintain peak reaction efficiency.

Figure 2:
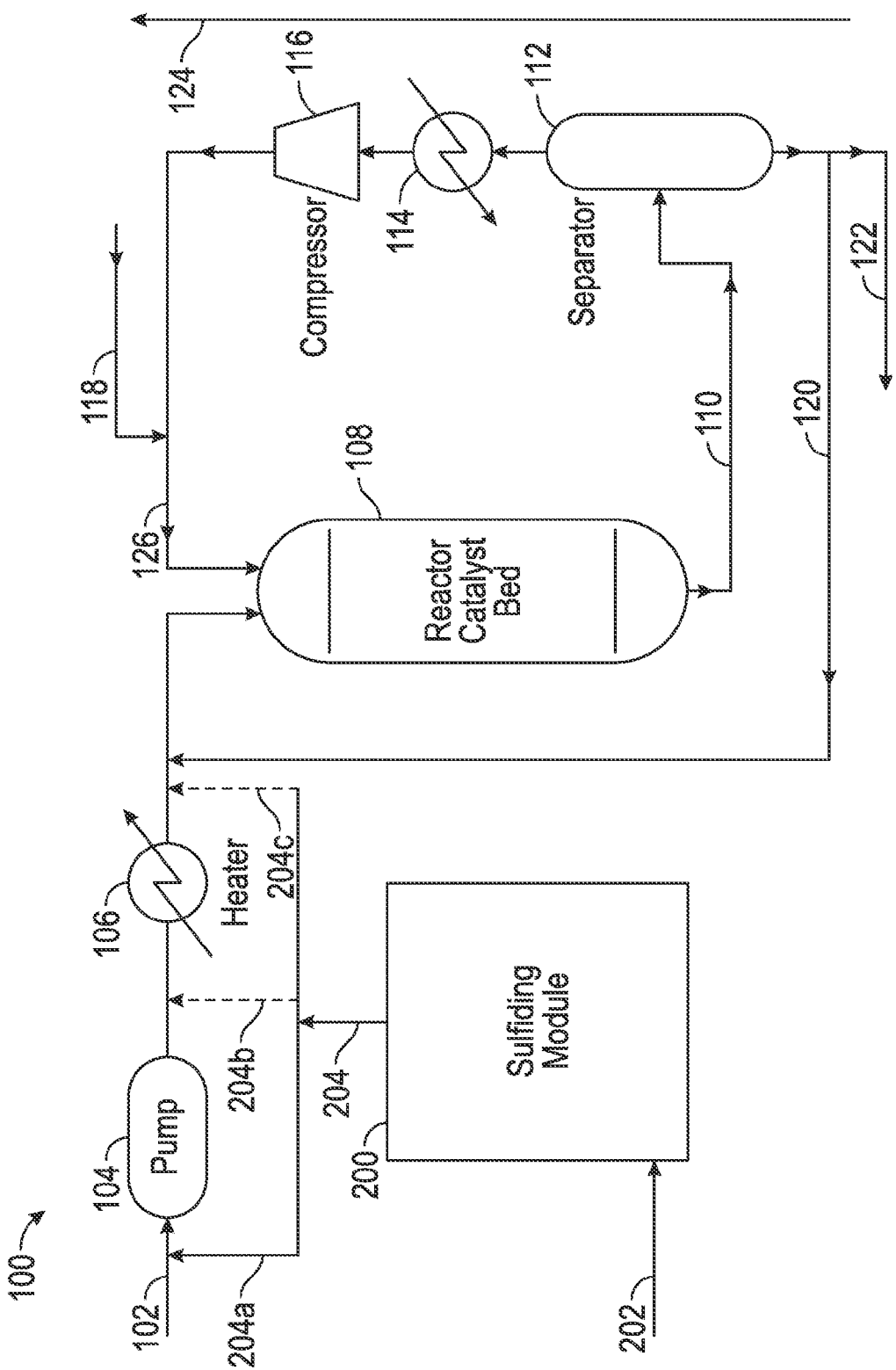
FIG. 2 illustrates the hydroprocessing unit of FIG. 1 with a sulfiding module according to the present invention.

FIG. 2 illustrates a refinery process 100 during a shutdown for sulfiding or re-sulfiding of the metal catalyst in reactor 108. Illustrated in FIG. 2 is a sulfiding module 200 comprising a sulfur product 202 inlet and a sulfur product outlet 204. As illustrated in FIG. 2, for liquid phase in-situ sulfiding the output 204 of sulfiding module 200 may be injected into process 100 at a location 204a upstream of pressurizing device 104, or at a location 204b downstream of pressurizing device 104 or at a location 204c downstream of heat exchanger 106. It will also be appreciated that for gas phase in-situ sulfiding output 204 may be injected into the gas recycle line 126.

It is contemplated, although not required, that sulfiding module 200 be a mobile unit, such as a trailer or sled, that can be transported to a refinery or to a location within a refinery adjacent a reactor vessel 108 in need of catalyst sulfiding. As discussed previously, the sulfur source 202 may be any of a number of conventional sulfur-bearing products such as, but not limited to, liquid DMDS, and such sulfur product 202 may be drawn from containers, such as tanker trucks (not shown) and the like.

Figure 3:
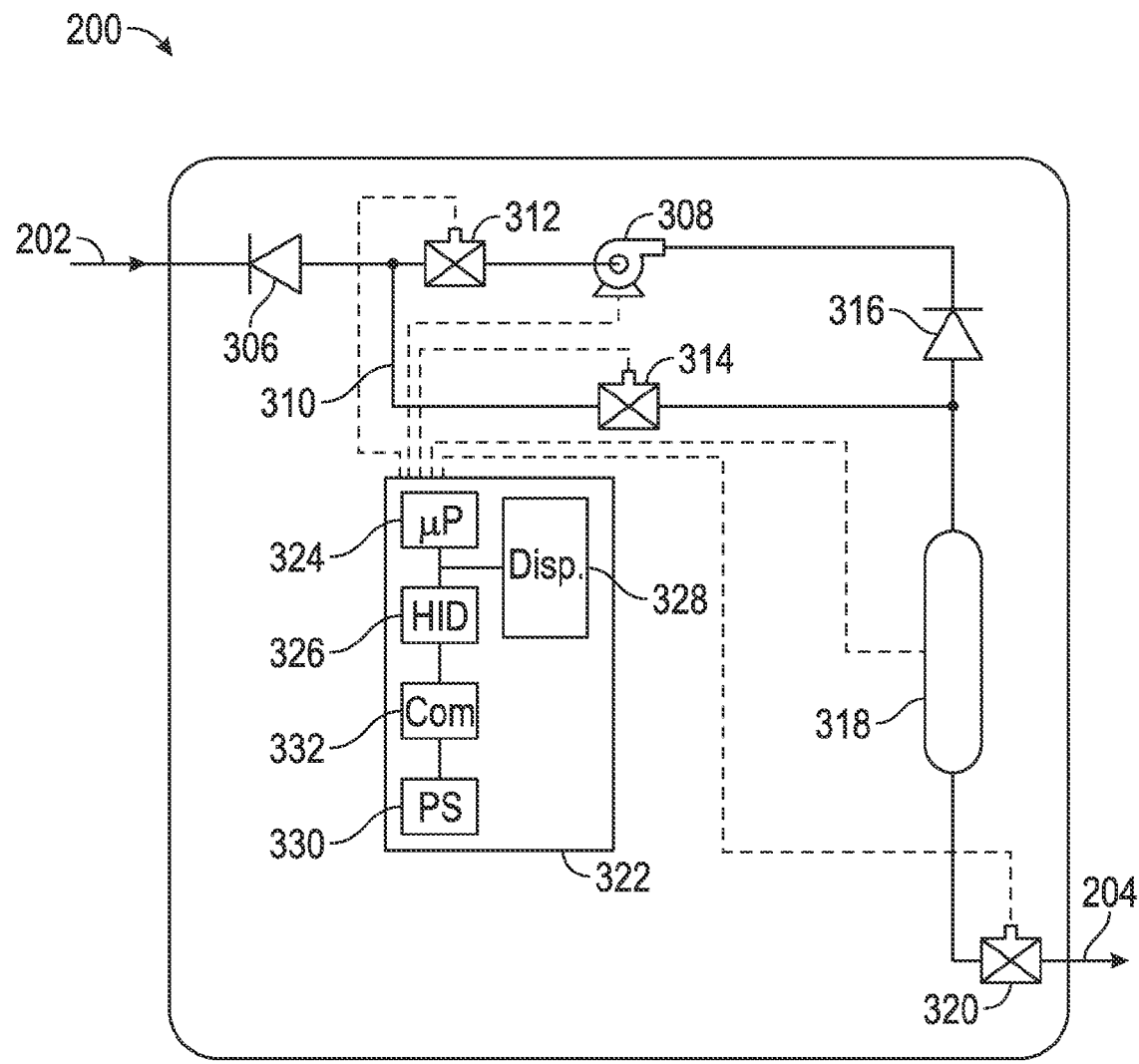
FIG. 3 illustrates one of many possible sulfiding modules according to the present inventions.

Turning now to FIG. 3, which illustrates one of many possible embodiments of a liquid phase in-situ sulfiding module 200 implemented on a mobile platform. The sulfiding module 200 may comprise a sulfur inlet 202 and a one-way flow device or check valve 306 configured to prevent sulfur product 202 from backing out of the sulfiding module 200. Downstream of the check valve 306 is a pump 308 configured to pressurize the liquid sulfur product 202 and inject it into the refinery process 100, such as illustrated in FIG. 2. Although liquid DMDS is used as the sulfur source 202 in this particular embodiment, it will be appreciated that gaseous forms of sulfur may be used, and in such cases pump 308 would be replaced with a compressor or other device capable of pressurizing a gas for injection into the process 100. It is presently preferred that the pump 308 be a semi-positive displacement type pump, such as a radial vane pump, and that the pump 308 be controllable, such as by a variable frequency drive and an A/C motor (not shown). For example, a low-pressure sulfiding module 200 may comprise a pump 308 configured to delivery between about 40 gallons/minute and about 60 gallons/minute of sulfur product 202 at about 200 psig to about 250 psig. Alternately, a high-pressure sulfiding module 200 may comprise a pump 308, such as a high pressure positive displacement triplex pump, configured to delivery between about 14 gallons/minute and about 20 gallons/minute of sulfur product 202 at a pressure up to about 3,000 psig. Those of skill having benefit of this disclosure will appreciate that a single sulfiding module 200 may comprise dual pressure systems. It will be appreciated that a sulfiding module 200 may be designed with other types of pumps or fluid pressurizing devices, including positive displacement pumps, centrifugal pumps, compressors and other types of fluid pressurizing devices.

Also illustrated in FIG. 3 is a pump bypass conduit 310 for those situations where the suction side of the process pump 104 may be used to draw sulfur product 202 into the system 100. Controllable valves 312 and 314 are shown and may be configured to allow the sulfur product 202 to pass through pump 308 or to bypass pump 308, as required for the specific process 100 at issue. Also shown in FIG. 3 is an additional one-way flow device or check valve 316 configured and located to prevent sulfur product 202 from back flowing into pump 308.

Once the sulfur-bearing liquid product 202 has passed through pump 308 or bypassed pump 308, the sulfur product 202 passes through a fluid measurement device 318 preferably capable of measuring a variety of properties of liquids and/or gases. At a minimum, it is preferred that the measurement device 318 be capable of measuring the volumetric flow rate of sulfur product 202. It is preferred, however, that the measurement device 318 be capable of and configured to measure and report not only volumetric flow rate but also mass flow rate, density, temperature, and other fluid properties. It is preferred that the measurement device 318 also be capable of indicating a loss of sulfur product or "dry pipe" condition to avoid pump 308 cavitation. For example and without limitation, it is presently preferred that the measurement device 318 be an Endress+Hauser ProMass 83E Coriolis mass flow measuring instrument. After passing through measurement device 318, the sulfur product 202 may pass through a final controllable valve 320 and exits the sulfiding module 200 through outlet 204.

FIG. 3 also illustrates that sulfiding module 200 may, and preferably does, comprise a controller 322 configured to receive inputs from and to provide outputs, such as control signals, to, at least, one or more of controllable valves 312, 314 and 320, pump 308 and measurement device 318. Controller 322 may comprise a microprocessor, programmable gate array, PID controller or other programmable logic device 324, a human input device 326, such as a keyboard or touchscreen, a visual display device 328, such as a liquid crystal display or other device capable of presenting visual information, memory, a power supply 330 for powering the controller 322 components and/or a communications component 332. Communications component 332 may comprise a wired or wireless communications interface. These various components of controller 322 are all configured and arranged in known fashion to provide data gathering, reporting and/or control of at least the various components on the sulfiding sled 200. It is preferred that the communications module 332 be a wireless interface or a wireless cellular interface, allowing monitoring and/or control of the sulfiding module 200 from one or more locations remote to the module 200. For example, and without limitation, the communications module 332 may allow the process 100 owner to monitor in substantially real time the pre-sulfiding process as reported by controller 332. Further, wireless and wired connection allows remote control of the sulfiding system from a computer or smartphone, such as, but not limited to, in the event of plant shut down or evacuation.

Figure 4:
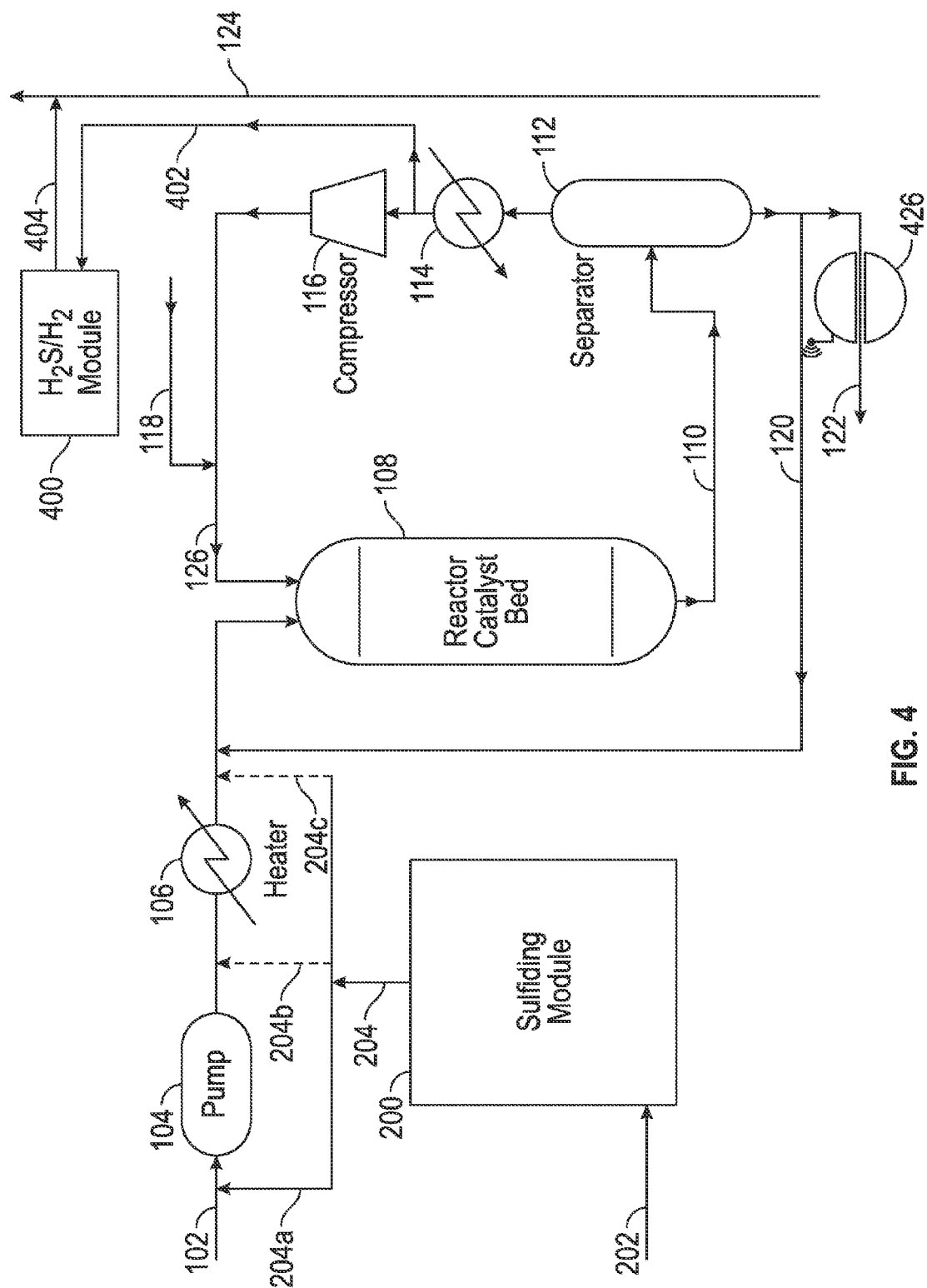
FIG. 4 illustrates the hydroprocessing unit of FIG. 1 with a sulfiding module and a detection module according to the present invention.

FIG. 4 illustrates the sulfiding system 200 shown in FIG. 2 with the addition of a combined hydrogen sulfide/hydrogen gas module 400. As is well known, during the sulfiding process, $H_2S$ and $H_2O$ are byproducts of the decomposition of the sulfur product 202, e.g., DMDS. It is known to measure the amounts of hydrogen sulfide generated during the sulfiding process to understand how the sulfiding process is progressing. Typically, $H_2S$ levels during sulfiding are measured using Draeger-Tubes® with self-contained breathing apparatuses and hand-held pumps designed to draw a fixed amount of gas into the tube on each pump stroke. It is also known that the sulfiding reaction requires the presence of hydrogen ($H_2$) gas and that decomposition of sulfur product 202 creates gasses, such as, but not limited to, methane that dilute the concentration of hydrogen gas in the reactor vessel 108.

As illustrated in FIG. 4, module 400 has an input 402, which preferably comprises a conduit plumbed between the process 100 and the module 400. The module 400 is configured to periodically, including substantially continuously, sample a portion of the sulfiding gas returning to reactor vessel 108 downstream of cooling heat exchanger 114, and preferably upstream of the compressor 116. It will be appreciated that depending on the configuration of the module 400 and the system 100, the gas sample may be obtained immediately downstream of separator 112, or downstream of compressor 116. As will be described in more detail below, the gaseous sample 402 is provided to module 400 for analysis, such as, for example, quantitative measurement, and reporting, such as to sulfiding module 200, and particularly controller 322, or to an external site such as a remote computer or the Internet. Once the gas sample has been tested, it may be sent to flare line 124 via outlet 404 or sent to other systems capable of disposing of or scrubbing the gas, such as venting to atmosphere, if appropriate.

Figure 5:
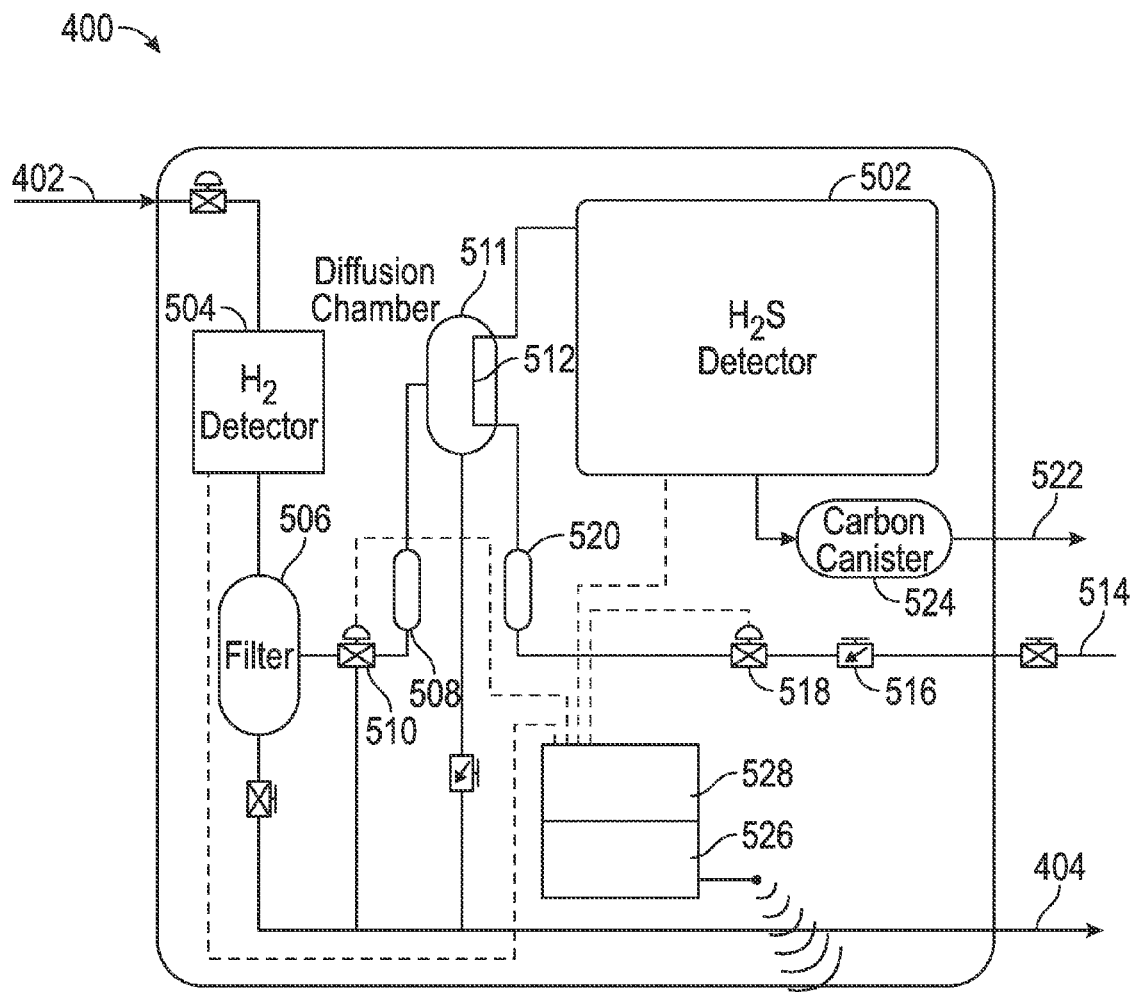
FIG. 5 illustrates one of many possible detection modules according to the present inventions.

As shown in FIG. 5, module 400 may comprise a hydrogen sulfide ($H_2S$) detection or analyzer system 502, such as, but not limited to, a lead acetate detection system, such as those available from Galvanic Applied Sciences, Inc. As is known, exposure of lead acetate tape to hydrogen sulfide results in a darkening of the white tape because of the formation thereon of lead sulfide. Module 400 may use a lead acetate detector system, or alternately, an electrochemical detector, such as the Model 5100 $H_2S$ Detector by Sierra Monitor, or other $H_2S$ detection system. Preferably, the $H_2S$ detection system used is capable of real-time or quasi-real-time detection and electronic reporting. If a lead acetate detection system 502 is used for module 400, it is preferred that an optical scanner or other device for converting information on the lead acetate tape into an electrical output, such as digital information, be used. Regardless of the detection system used, it may be desirable or necessary to provide a plurality of detection ranges, such as 0-500 ppm, 0-20,000 ppm and 0-30,000 ppm.

Module 400 may also comprise, and preferably does comprise, a hydrogen ($H_2$) gas detector 504, such as, but limited to, the HY-OPTIMA 2740 Explosion Proof In-Line Process Hydrogen Monitor available from $H_2$Scan Corporation. The type of hydrogen gas detector that can be used is not intended to be limited and includes detectors that are based on surface plasmon resonance sensors, electrochemistry sensors, MEMS sensors, thin film sensors, thick film sensors, chemochronic sensors, diode based sensors or metallic sensors. If a $H_2$ detector 504 is used, it is preferred that it also be capable of real-time or quasi-real-time detection and electronic reporting.

As illustrated in FIG. 5, a quantity of recycle gas 402 enters module 400 and, if present, preferably passes through hydrogen detector 504, which determines the concentration of hydrogen gas in the sample 402. The sample 402 then may pass through a coalescing filter 506 to remove water and hydrocarbon liquids that may be entrained in sample 402. It will be appreciated that depending on the type of hydrogen detector 504 used, the coalescing filter may be placed upstream of the hydrogen detector 504. Liquids coalesced by the filter 506 may drop out to module outlet 404 for communication with flare line 124, for example. After passing through the filter 506, the gas sample 402 may preferably pass through a flow meter 508, such as, but not limited to, a variable area flow meter, including a rotameter. It is not typically necessary for the flow meter 508 to be capable of electronic reporting, but such functionality is not excluded. The flow meter 508 will typically have associated therewith an adjustable orifice, such as a needle valve, to finely adjust the flow rate of the gas sample 402 ultimately delivered to the $H_2S$ detector 502. Shown disposed between the filter 506 and the flow meter 508 is controllable valve 510, which preferably also has pressure relief capabilities. The valve 510 can be closed in which state the gas sample 402 will pass through outlet 404. In addition, if the gas pressure exiting filter 506 is too high for $H_2S$ detector 502 (or $H_2$ detector, if so plumbed), the relief valve will open thereby venting the gas sample to the outlet 404.

Once gas sample 402 passes through flow meter 508, it passes into a diffusion chamber 510. Diffusion chamber 511 comprises a permeable membrane 512, such as permeable tubing. Nitrogen gas 514, typically supplied by the refinery, enters the module 400 as shown and may pass through a flow control valve or metering valve 516 and/or a controllable valve 518 before it reaches a flow meter 520, such as, but not limited to a variable area flow meter, including a rotameter. Similar to flow meter 508, it is not typically necessary for the flow meter 520 to be capable of electronic reporting, but such functionality is not excluded. The flow meter 520 will typically have associated therewith an adjustable orifice, such as a needle valve, to finely adjust the flow rate of nitrogen gas 514 ultimately delivered to the diffusion chamber 511. For the lead acetate based detector 502 in this example, the gas sample 402 is diluted at a ratio of about 1 part gas sample to about 1000 parts nitrogen gas.

Inside the diffusion chamber 511, $H_2S$ gas diffuses into the nitrogen gas stream separated by the permeable membrane 512 and the combined $H_2S$ and $N_2$ gas stream is fed to the lead acetate $H_2S$ detector 502, as illustrated. The $H_2S$ detector 502 determines the concentration of $H_2S$ in the sample and generates an electronic signal representative of the $H_2S$ concentration. In this example, because $H_2S$ detector 502 is a lead acetate detector, the gas sample that exits detector 502 is free, or substantially free, of $H_2S$ and the gas sample may be vented to atmosphere 522 after, preferably, passing through a carbon filter 524. It will be appreciated that if other types of $H_2S$ detectors are used, such as, but not limited to, electrochemical detectors, the arrangement and plumbing within module 400 may change according to the operating parameters and requirements of the detector. And, the gas sample exiting the detector may need to be plumbed to the flare line 124 instead of vented to atmosphere.

Module 400 may also comprise, and preferably does comprise a communications module 526 that can communicate wirelessly or over wire to sulfiding module 200 or to a remote site, including a remote controller, computer or the Internet. In a preferred embodiment, module 200, and, for example, controller 322, is configured to receive a wireless data transmission from module 400 and, report, for example, the hydrogen sulfide concentration data and hydrogen gas concentration data through communications module 332. Alternately, or additionally, module 200 and specifically controller 322, can use the data obtained from the module 400 to control the sulfiding process. For example and without limitation, as the hydrogen sulfide concentration increases in the gas sample from the sulfiding process, controller 322 can slow down sulfur pump 308 or otherwise adjust the amount of sulfur product been supplied to the sulfiding process. Similarly, as the $H_2$ gas concentration decreases in the gas sample 402, the refinery operator can supply additional $H_2$ gas through $H_2$ makeup line 118.

Module 400 may also comprise a controller 528, such as a microprocessor, programmable gate array, PID controller or other programmable logic device 324. The controller also may be operatively coupled to a human input device, such as a keyboard or touchscreen, a visual display device, such as a liquid crystal display or other device capable of presenting visual information, memory, a power supply for powering the controller 322 components and the communications component 526. It will be appreciated that the controller 528 and communications component 526 may interact to allow control of the components associated with module 400.

Although this description of an embodiment of module 400 comprises a combined $H_2S$ and $H_2$ detection capability, it will be appreciated that module 400 can have $H_2S$ only detection capability, $H_2$ only detection capability or the combined ability as described. Also, separate $H_2S$ and $H_2$ modules can be used together as described above.

Having now described embodiments of our sulfur supply module 200 and our detection module 400, we turn now to a discussion of one of many possible embodiments of an in-situ sulfiding method using our inventions. In practice, a sulfur supply module 200 and a combined hydrogen sulfide and hydrogen gas detection module 400 may be delivered to a refinery location and positioned adjacent a hydroprocessing unit 100 having catalyst to be sulfided. The outlet 204 of the sulfur supply module 200 may be plumbed into a preferably existing injection port (not shown) in the hydroprocessing unit 100. As described with respect to FIG. 2, such injection port may be located at locations 204a, 204b, 204C or other suitable sulfur injection site or sites. A supply of sulfur product, such as, but not limited to liquid DMDS, will be provided, such as in the form of a tanker truck or trucks. A conventional suction hose resistant to the sulfur product can be plumbed between the tanker truck outlet and the inlet 202 to sulfiding module 200. Similarly, the detection module 400 may be placed adjacent a portion of the hydroprocessing unit 100 where access to the sulfiding gas return 126 is provided. A flexible conduit is preferably attached to a valved extraction port already existing in the hydroprocessing unit 100 and plumbed to the inlet port 402 on the module 400.

It is preferred, but not required, that that the connections and components of sulfiding module 200 be leak tested before the sulfur product is injected, such as by using diesel or other inexpensive, liquid hydrocarbon to test/purge all lines and connections. The diesel may be injected by module 200 into the hydroprocessing system 100 after set up of the sulfiding module 200 and prior to commencement of sulfur product injection into process 100. This leak testing with, for example, diesel reduces the risk of sulfur product leaks during sulfiding. Similarly, after sulfiding is completed, a post-sulfiding purge of the sulfiding module 200 and reactor vessel 108 may be performed in similar fashion.

Power in the form of AC energy supplied by the refinery or DC battery power supplied on the sulfiding module 200 and detection module 400, or power supplied by a portable generator may be supplied to both modules 200 and 400. Both modules may be powered up and the equipment initialized and checked. The communication link, whether wired or wireless, may be established. In a preferred embodiment, a laptop computer may be used to establish wireless communication among the sulfiding module 200, the detection module 400 and the laptop (not shown). The wireless link among these modules and the laptop computer allows the laptop computer and operator to see the operating condition of all components.

Figure 6:
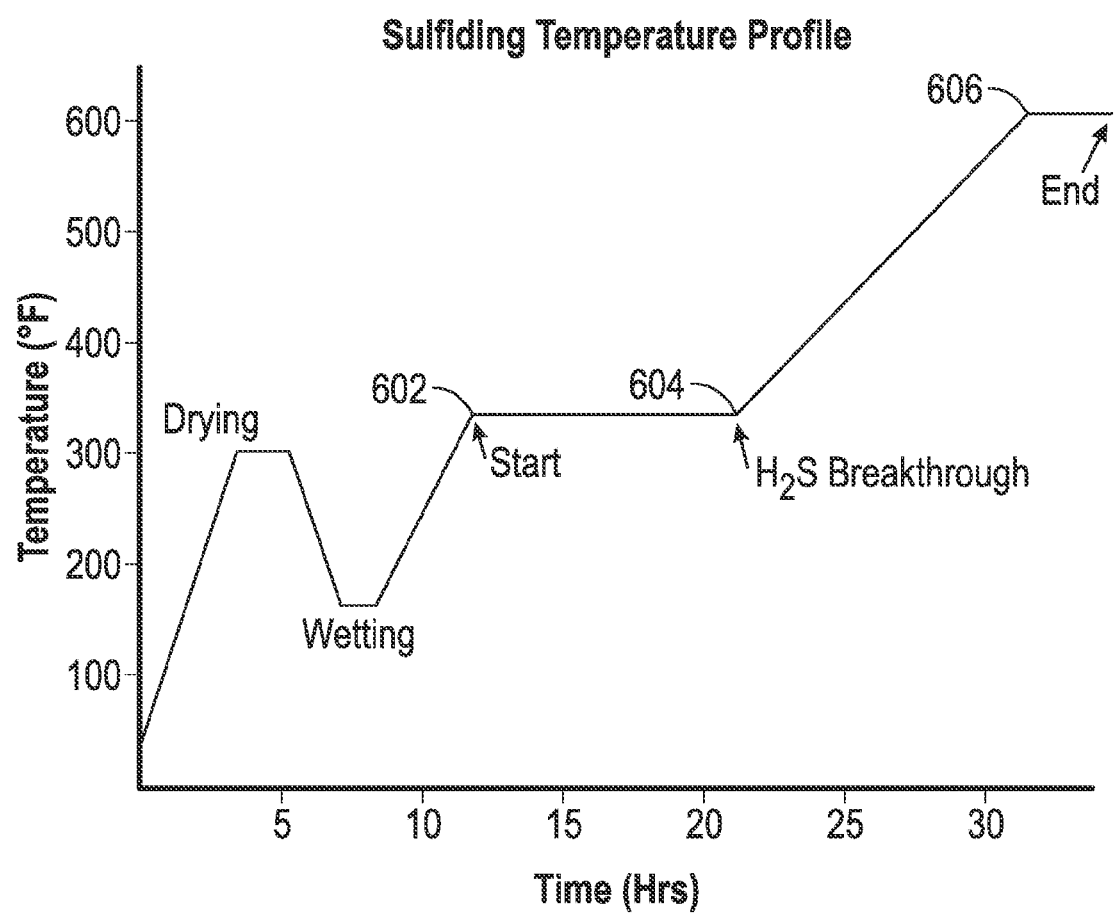
FIG. 6 illustrates a typical sulfiding temperature profile according to the present invention.

FIG. 6 illustrates a typical sulfiding temperature profile for sulfiding a metal catalyst with liquid DMDS. Once the hydroprocessing unit 100 is ready for the sulfiding process the catalyst in reactor vessel 108 may be dried in conventional fashion, such as by purging the reactor vessel 108 with hydrogen gas (typically supplied by the refinery), or other dry gas, or with liquid feedstock. As an example only, the reactor vessel 108 may be run up to a temperature of about 300° F. and pressure of about 200 psig to about 500 psig on hydrogen gas for a period to dry satisfactorily the metal catalyst therein. Thereafter, during the wetting step, the reactor temperature is reduced to between about 150° F. to about 250° F. and hydrocarbon feedstock is introduced to wet the catalyst.

After wetting, the reactor temperature is increased to the sulfur source's (e.g., DMDS) $H_2S$ decomposition temperature range, such as about 350° F. to 450° F. At this point in the temperature profile 602, and as shown in FIG. 6, the sulfiding module 200 may be energized and the controller 322 starts pump 104 to begin delivery of the sulfiding product, such as DMDS, into the hydroprocessing unit 100 at a first flow rate. During this first sulfiding phase or plateau, the temperature remains relatively constant at about 350° F. to 450° F. for an extended period, and the flow rate of sulfur product typically will gradually or step-wise increased. As is known, $H_2S$ removal from the recycle gas stream is discontinued, when possible, until sulfiding is completed. During this first phase of sulfiding, $H_2S$ concentration in the recycle gas will remain relatively low, such as about 30 ppm to about 160 ppm or even up to about 200 ppm. As is also known, hydrogen gas may need to be introduced into the hydroprocessing unit 100 to ensure a reasonably constant and appropriate hydrogen gas concentration in the reactor vessel 108.

This first sulfiding phase or plateau effectively ends at a point 604, which is often referred to as $H_2S$ breakthrough. Theoretically, $H_2S$ breakthrough occurs when the reactants reach thermodynamic equilibrium at given process mass flux. In reality, $H_2S$ breakthrough is recognized when $H_2S$ concentration in the recycle gas 402 rapidly increases. The present invention will detect and report this increase in $H_2S$ in essentially real time by detection module 400. $H_2S$ breakthrough typically is not a universally accepted $H_2S$ concentration value, and usually refinery operators have their own standard for when breakthrough is recognized. For example, and without limitation, breakthrough may be considered to occur when $H_2S$ concentrations reach about 3,000 ppm or higher, even up to about 5,000 ppm. In theory, approximately one-half of the stoichiometric amount of sulfur should have been injected before breakthrough is reached. In practice, the percentage can range from about 50% to about 65% of the stoichiometric amount. The fluid measurement device 318 in module 200 may be configured to substantially continuously report the total mass or volume flow of sulfiding agent that has been injected at any point in time and, therefore, the sulfiding module 200 can report when the stoichiometric breakthrough point (by mass) is approaching or has been reached.

Regardless of how or when breakthrough is determined, as shown in FIG. 6, once $H_2S$ breakthrough is determined, the reactor temperature is raised to about 600° F. to about 650° F. by use of heat exchanger 106 to increase the sulfiding of the catalyst. The rate of temperature increase typically will depend on the metallurgical constraints of the process 100, and is usually controlled by the process operator. At this point 606 in the temperature profile, the second sulfiding regime or plateau begins and the temperature remains relatively constant at about 600° F. to about 650° F. for a period until sulfiding is complete; e.g., until the pre-determined amount of sulfur product has been injected.

As will be discussed in more detail below, during this sulfiding process the flow rate of sulfur product (e.g., DMDS) supplied by module 200 can be controlled by ator accessing the controller 322, through the communications link, such as via a laptop or Internet computer, and issuing commands to controller 322 and, therefore, pump 104. Alternately, controller 322 can automatically control the flow rate of sulfur product according to logic steps or programming residing in one or more memory modules accessible by controller 322.

Figure 7:
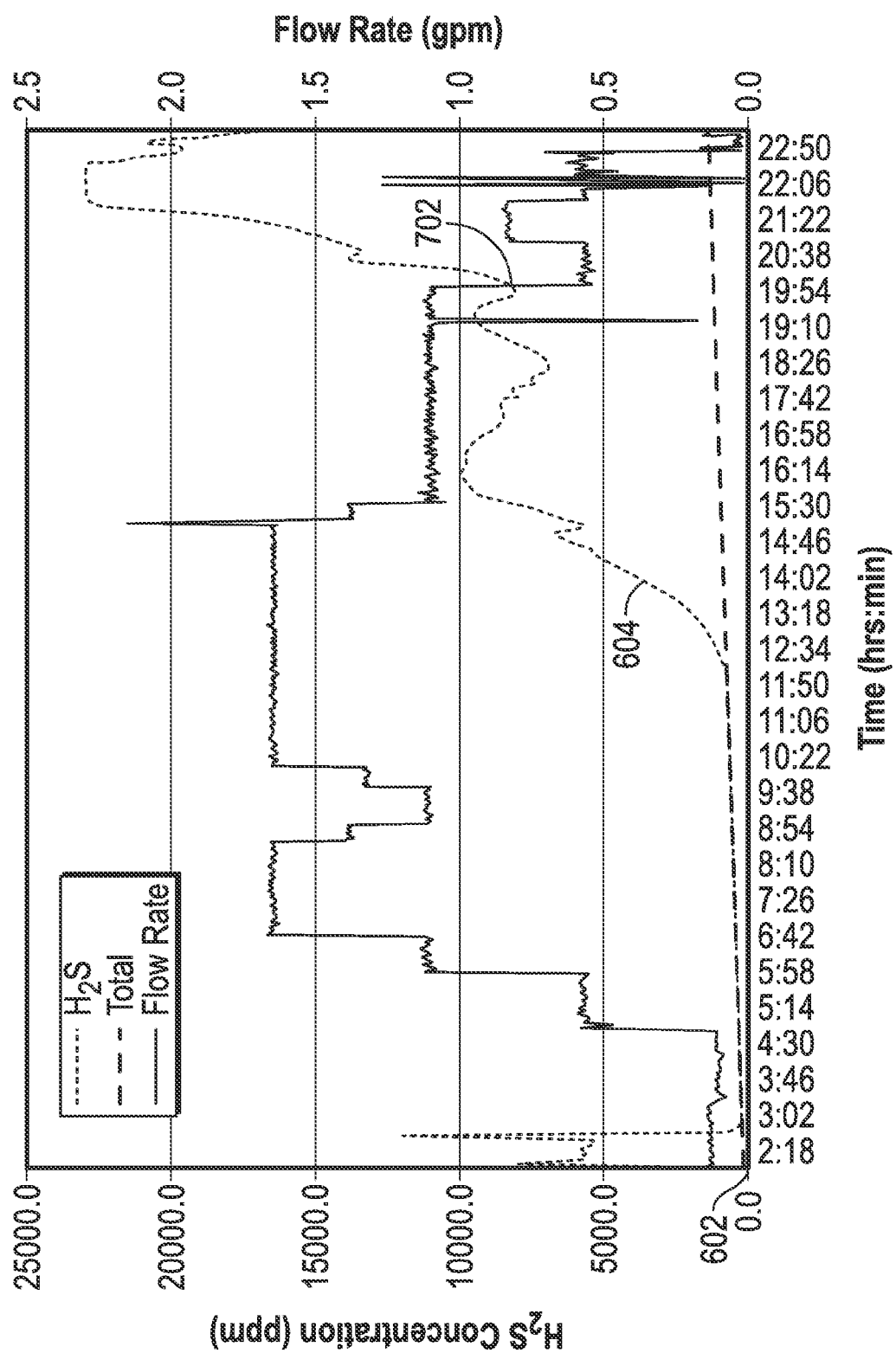
FIG. 7 illustrates hydrogen sulfide concentration as a function of time, and sulfur product flow rate as a function of time according to the present invention.

At the back end of the hydroprocessing unit 100, the detection module 400 continuously or substantially continuously monitors the hydrogen sulfide concentration and hydrogen gas concentration of the sulfiding gas (recycle gas) that is returned to the reactor 108. The data supplied by the module 400 may be used by the operator and/or controller 322 to increase the supply of sulfur product 202 to the sulfiding process or to decrease the amount of sulfur product to the sulfiding process. For example, if the total $H_2S$ content in the gas decreases below a predetermined value (such as, for example, 1,000 ppm) controller 322 can cause, either through operator input or by pre-programmed logic, the sulfiding module 200 to increase the supply of sulfur product to the catalyst residing in reactor 108. Alternately, as the amount of $H_2S$ in the recycle gas stream increases to, for example, 10,000 ppm or above, controller 322 can decrease the amount of sulfur product supplied to the system 100. For example, our sulfiding methods and systems can control the injection of sulfur product (i.e., control pump 104) by monitoring the $H_2S$ concentration in the recycle gas. During sulfiding, the modules 200 and 400 can interact and cooperate, alone or with external input, to maintain $H_2S$ concentrations between about 3,000 ppm and 23,000 ppm, as shown in FIG. 7, and most preferably between about 3,000 ppm and 10,000 ppm. By preferentially and proactively controlling the amount of $H_2S$ in the recycle gas, the amount of waste hydrogen sulfide that has to be flared or otherwise disposed of can be minimized. It will be appreciated that minimizing the flaring of hydrogen sulfide gas reduces, if not eliminates, a refinery's potential sulfur oxide emissions caused during sulfiding operations.

Referring again to FIG. 7, the graph shows hydrogen sulfide concentration in the sample gas from the recycle line versus process time, and sulfur product flow rate versus process time. FIG. 7 illustrates that on beginning of the sulfiding process at point 602, the flow rate of sulfur product is increased, preferably in stepwise fashion, to create a buildup of hydrogen sulfide gas during this first sulfiding stage. Once $H_2S$ breakthrough is recognized at, for example, point 604 because of an increase in $H_2S$ gas, the flow rate of sulfur product 202 may be adjusted, such as decreased or increased, to maintain an optimum concentration of $H_2S$ and avoid an overabundance of waste $H_2S$. The flow rate of the sulfur product may be adjusted by varying the speed of pump 108 or by adjusting controllable valve 320, or a combination of both actions.

FIG. 7 also illustrates what is commonly referred to a second $H_2S$ breakthrough 702 when using liquid DMDS as the sulfur source. When this second breakthrough is recognized, it typically marks complete sulfiding of the catalyst and sulfur product injection can be substantially decreased, including stopped. For example, and in contrast to what is illustrated in FIG. 7, if the inventions described herein are configured to limit $H_2S$ concentration to 10,000 ppm, when the second breakthrough is recognized, the inventions described would reduce the pump 108 speed dramatically to prevent the $H_2S$ concentration in the gas stream from exceeding 10,000 ppm. This type of control strategy based on $H_2S$ concentration will reduce the amount of sulfur product consumed and decrease the amount of waste $H_2S$ gas that must be sent to the flare line 124 or amine scrubber.

Figure 8:
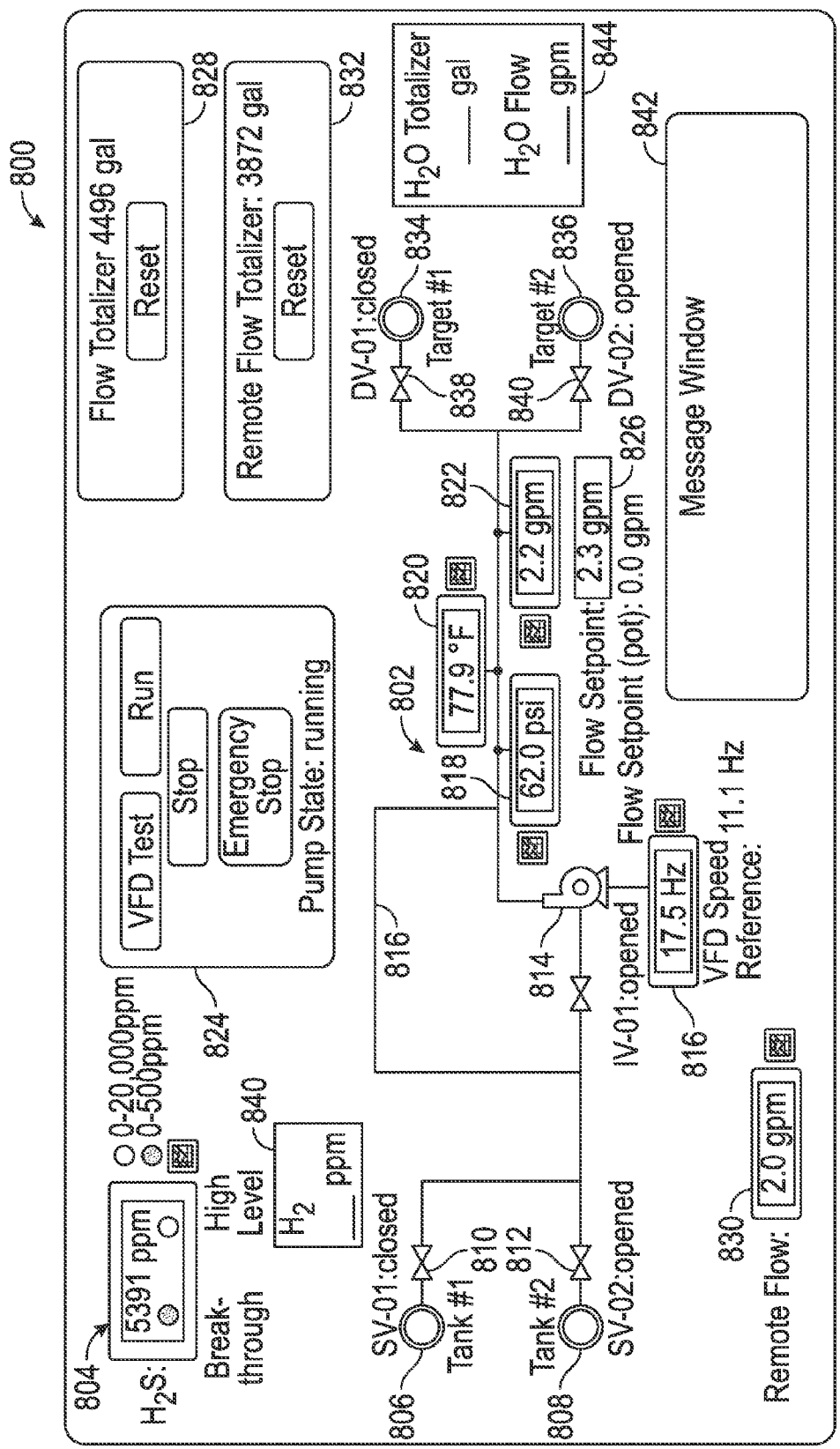
FIG. 8 illustrates one of many possible graphical user interfaces for use with the present inventions.

FIG. 8 illustrates one of many possible embodiments of a remotely displayed sulfiding system interface 800 for use with the present inventions. This interface 800 screen is the product of a properly configured and programmed sulfiding module 200 and detection module 400, and has a simplified piping diagram of a sulfiding module 802 similar but not identical to sulfiding module 200 discussed in FIGS. 2 and 3. A detection module, such as module 400 in FIG. 4, is represented by $H_2S$ display 804 and $H_2$ display 840. Display 804 can indicate the sensitivity or range that the hydrogen sulfide detection module is currently operating in and the interface can be used to change between the ranges. The display 804 also has indicators that can show when $H_2S$ breakthrough has been reached. As discussed above, because this point in the process is not precisely defined, the system allows the breakthrough $H_2S$ concentration to be programmed into the interface for each sulfiding process. Display 800 also has a high $H_2S$ level indicator that may be programmed to show when the sulfiding process is complete, such as when both the breakthrough and high-level indicators are energized. The interface can be configured such that after the first breakthrough point is recognized, the rate of change $H_2S$ concentration is determined and an increasing rate of change may be used to indicate that the second breakthrough has been reached.

The sulfiding module 802 illustrated in FIG. 8 shows two sulfur product inlets 806 and 808, each with controllable valves 810 and 812. The interface preferably has the ability to indicate the state, such as opened or closed, of the inlet valves, 810 and 812, and register those states on the display. The inlets are shown to communicate with a pump 814 and a pump bypass loop 816. The pump 814 is preferably driven by an AC motor having a variable frequency drive (not shown). The status of the pump 814 is shown by readout 816, which can display revolutions per minute, frequency or pump flow volume. The flow measurement device 318 described in FIG. 3 is represented in interface 800 by readout 818 showing sulfur product pressure, readout 820 showing sulfur product temperature and readout 822 showing sulfur product flow rate. Additional readouts may be added depending on the functionality of the fluid measurement device actually used. For example, a sulfur product density readout and/or sulfur concentration readout may be utilized. Interface 800 also shows two sulfiding module outlets 834 and 836 and associate controllable valves 838 and 840. Although not shown, interface may also provide a "dry pipe" condition indicating that flow of sulfur product has been interrupted.

Interface 800 shows a pump status window that can report whether the pump is running or not and allow for emergency pump stop. A sulfur product volumetric flow rate set point window 826 is shown and the flow rate set point can be set by accessing the controller 322 on module 200. Also shown on interface 800 is a total volumetric flow rate window showing the total sulfur product injected into the hydroprocessing unit 100 at any particular time. Although not shown, interface 800 may present a $H_2S$ breakthrough set point window in which the total volumetric flow is shown that correlates to 50% to about 65% of the stoichiometric sulfur needed to completely sulfide the catalyst, as discussed above.

Interface 800 also shows that more than one sulfiding module may be used to inject sulfur product into the hydroprocessing unit 100. Remote flow readout and remote flow totalizer window 832 provide information on second sulfiding module injecting sulfur product a second location in the unit.

FIG. 8 also shows that the interface may comprise a message window 842 that permits written or graphic communication among users of the interface. For example, the sulfiding contractor may use the messaging capability to inform the process 100 operators of a need for hydrogen makeup.

FIG. 8 also shows that the interface may comprise water flow rate and total water extracted. It is known that water is a byproduct of the sulfiding process and the process operators will routinely monitor and extract water from process 100 such as through outlet 122 shown in FIG. 4. The present inventions may also comprise a water detection device 426 (see FIG. 4) that can be coupled to outlet 122 (or a water boot or similar structure) to detect and report to interface 800 (and/or controller 322) the flow rate of water and the total of water extracted from the system during sulfiding. It will be appreciated that the amount of water generated by the sulfiding reaction is a direct measure of how the sulfiding reaction is progressing. As illustrated in FIG. 4, it is preferred that the water detection device 426 have the ability to wirelessly communicate with the interface 800 and/or the controller 322.

Once catalyst sulfiding has been completed, the present inventions can generate a sulfiding report, such as illustrated in FIG. 7, and which can further include parameters such as total mass and volume of sulfur injected, total water removed, and other data or parameters recorded, monitored or indicated during the sulfiding process.

In a preferred embodiment, the sulfiding module and the detection module can be monitored and controlled via a wireless data and communication link among the modules and a computer, such as a conventional laptop or desktop computer. The interface is preferably configured to allow monitoring and control of all aspects of the sulfiding module and the detection module. Alternately, the monitoring and control may be accomplished by a suitable configured website using conventional programming techniques to accomplish the functionality described herein. Still further, monitoring and control can be accomplished through a smart phone application.

In light of the foregoing description of at least one of the many possible embodiments of an in situ sulfiding system and method utilizing the disclosed inventions, other embodiments providing additional functionality will be described. For example, it is known that when performing in situ sulfiding of alumina silicate based catalysts (such as those catalysts typically used in hydrocrackers), hydrocarbon cracking may occur. It is normally considered undesirable to allow hydrocracking during the sulfiding process. To lessen the potential for hydrocracking during sulfiding of the catalyst, the sulfiding systems disclosed above may be modified by providing a controllable source of ammonia, such as, but not limited to, aqueous ammonia ($NH_3$ (aq)), anhydrous ammonia ($NH_3$), aniline ($C_6H_5NH_2$), amines, amides or other organic nitrogen compounds that will undergo hydrodenitrogenation to form ammonia ($NH_3$) during the sulfiding process. Ammonia will react preferably with highly acidic sites on the hydrocracking catalyst substrates, thereby reducing, passivation or neutralizing those sites. Reduction in the number and/or activity of acid sites will preferably lessen the potential for hydrocarbon cracking during sulfiding.

Figure 9A:
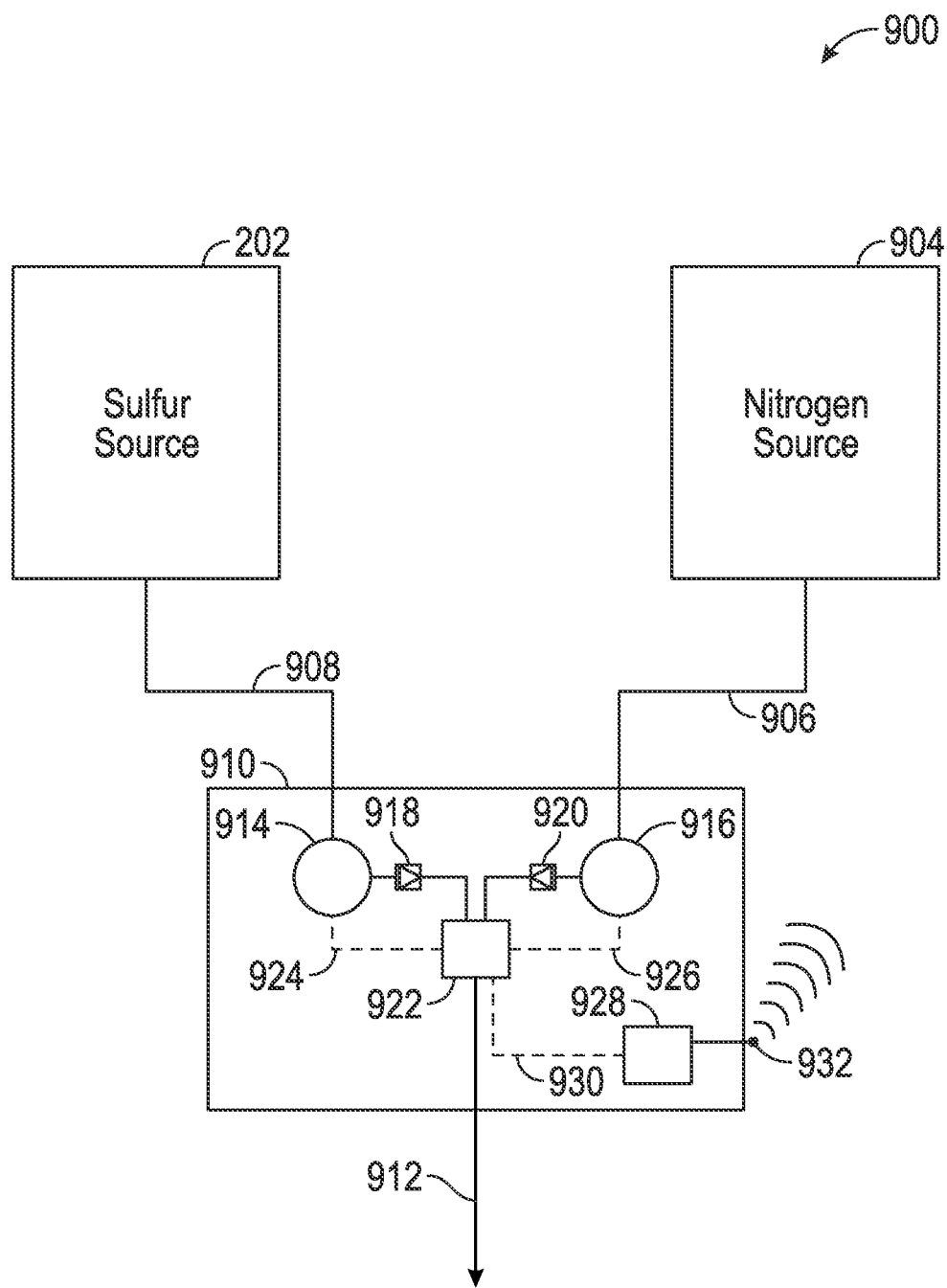
FIG. 9A illustrates a flow diagram for one of many possible combined catalyst sulfiding and passivating system and method.

FIG. 9A illustrates one of many possible combined sulfiding and passivating systems and methods. FIG. 9A illustrates a mixing and metering component 900 the output 912 of which can be fed into the sulfiding module 200 shown in FIGS. 2, 3 and 4 at input 202. As shown in FIG. 9A, a nitrogen-containing liquid ammonia source 904 (aqueous ammonia for this example) is provided in conjunction with a liquid sulfur source 202 (DMDS for this example). The ammonia source 904 is fed 906 to a mixing station 910, and the sulfur source 202 is fed 908 to the mixing station 910. Preferably, the mixing station comprises controllable pumps 914 and 916, preferably positive displacement pumps, and a mixing manifold 922. One-way flow valves 918 and 920 may be placed between the pumps and the manifold 922 to prevent back flow. In a preferred embodiment, the mixing station 910 comprises a controller 928 or logic device that can generate and send control signals 924, 926, 930 to the pumps 914 and 916, and to controllable valving in the manifold 922, if any (not shown) to control and adjust the amount of and ratio of sulfur source and ammonia source. It is also preferred that mixing station 910 be able to communicate, such as wirelessly 932, with controller 322 on sulfiding module 200.

Alternately, rather than being a separate component, the mixing/metering component 900 may integral to the sulfiding module (e.g., module 200 in FIG. 4). Also, rather than controllable pumps 914, 916, the mixing/metering component may comprise pumps and controllable metering valves or devices.

It will be appreciated that as ammonia is generated during the sulfiding process described above, the ammonia will react with acidic sites on the catalyst. In a typical hydrocracking process, the hydrodenitrogenation preferably will occur in the pretreating catalyst bed and the generated ammonia will be used in the hydrocracking bed to neutralize the acidic catalyst sites. Therefore, the amount of ammonia present in the gas exiting the hydrocracking bed will remain low while the ammonia is being consumed in passivating the acidic sites. In contrast, a detectable increase in ammonia in the gas exiting the hydrocracking bed may be realized once the acidic sites have been passivated and, therefore less ammonia is being consumed. It is contemplated that an ammonia detection system may be utilized in, for example, the gas recycle line 126 to detect the presence or amount, whether relative or absolute, of ammonia. Detection of ammonia may also be possible in liquid recycle line 120. Alternately or simultaneously, the pH of the water generated by the sulfiding process and collected in the water boot or product line 122 may be monitored. As less ammonia is consumed by the acidic sites the pH of the water will rise indicating that the catalyst has been passivated. This increase in available ammonia, whether detected in the gas recycle, liquid recycle or generated water, is referred to generally as passivation or ammonia breakthrough. When this breakthrough is detected, it is presently preferred that the injection of ammonia source be reduced by between about 30% and 70%, and most preferably by 50%. The available ammonia or pH of the water may continue to be monitored and the injection of ammonia source stopped, temporarily or permanently, as desired.

While ammonia source may be injected at any time, such before the sulfur source, simultaneously with the sulfur source or after the sulfur source, it is presently preferred to begin ammonia source injection once the first sulfiding plateau has been reached. For example, and not limitation, and referring to FIG. 6, ammonia source injection may begin once the sulfiding process has reached point 602, point 604, or somewhere between points 602 and 604. It will be appreciated that because hydrodenitrogenation preferably occurs in the pretreating (hydrotreating) bed, this first sulfiding plateau preferably is with respect to the pretreating bed, and not necessarily (although it may be) with respect to the hydrocracking bed. It also will be appreciated that a given catalyst has a critical temperature defining when hydrocracking typically begins. It is preferred, although not required, that ammonia breakthrough occur before the catalyst reaches its critical temperature.

Additionally, because hydrocracking is an exothermic process (as is sulfiding), the temperature profile of the reactor beds, and particularly the temperature profile of the hydrocracking reactor bed may be monitored to assess whether hydrocracking is occurring. If undesired hydrocracking is detected, the sulfiding/ammoniation process described herein may be adjusted, automatically or manually, such as by increasing the injection of ammonia source to increase the passivation of acidic catalyst sites. Also, the present invention contemplates monitoring the liquid in the liquid recycle line 120 to determine if the presence of light hydrocarbon products are increasing, which would indicate hydrocracking is occurring. Signals from these transducers may be transmitted wirelessly or otherwise to a controller, such as controller 528 or 928, or to an external site, such as a website or computer. The controller or external site may allow manual manipulation or automatic manipulation of one or more control points discussed in this application, such as, but not limited to, flow rate.

It will be appreciated that while the above example is based on a liquid process, a gaseous nitrogen-containing source (e.g., anhydrous ammonia) may be used. Those of skill will appreciate that certain modifications to the description will be necessary, not the least of which will be replacing the nitrogen pump with a compressor or other device for pressurizing the gas.

Figure 9B:
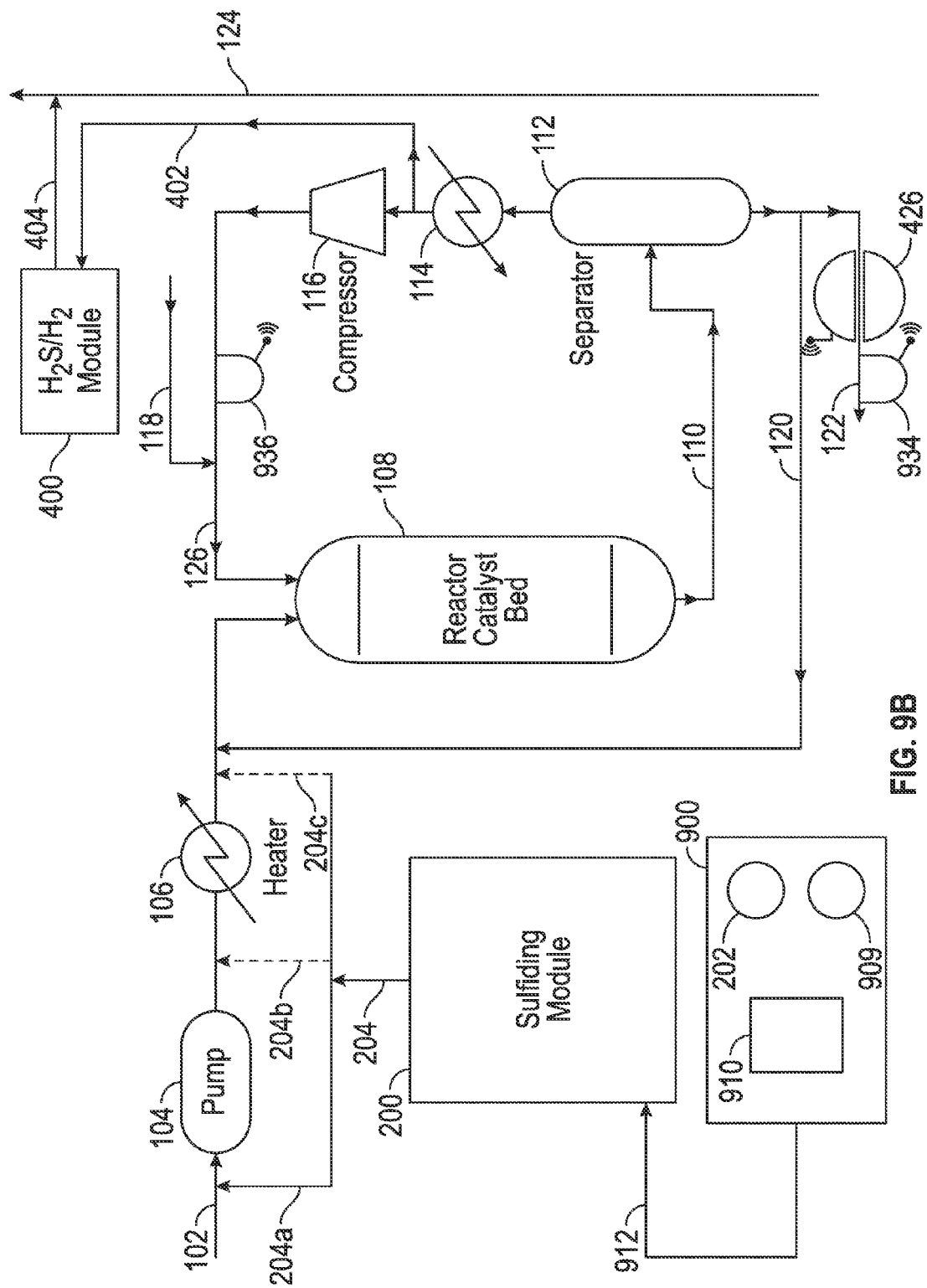
FIG. 9B illustrates a hydroprocessing unit, such as shown in FIG. 1, with sulfiding and passivating modules.

FIG. 9B illustrates a sulfiding process, such as the process shown in FIG. 4, in conjunction with an ammoniating process as described with respect to FIG. 9A. As can be seen, the liquid input to sulfiding module 200 now comprises a variable mixture of a liquid sulfur source 202 and an ammonia source 904 as part of a mixing module 900. Also illustrated is a pH detector 934 in communication with the water generated by the sulfiding process. Also illustrated is an ammonia detector 936 in communication with the gas recycle line 126. It is preferred, but not required, that these detectors be capable of wireless communication with either or both of sulfiding module 200 or mixing module 900. It is also preferred that interface 800 be configured to report the pH 934 of the generated water and/or the ammonia content 936 of the liquid recycle line 120. The interface 800 also is preferably configured to control the start/stop of the mixing module pumps 914 and 916 and mixed solution or compound 912. It will be appreciated that with the systems and processes described above, a user can begin the ammoniating process before, simultaneous with, or after the sulfiding process has begun. Similarly, the ammoniating process can be ended (such as by discontinuing the injection of the nitrogen source) before, simultaneous with, or after the sulfiding process has ended. Thus, the disclosed inventions can be implemented to reduce the propensity for catalysts having an acid function to promote hydrocracking during sulfiding by passivating acidic sites through contemporaneous ammoniation.

As a further embodiment of the present invention, it is known that once hydrotreating catalysts (whether of γ-alumina or alumina-silicate substrate) have been freshly sulfided, their reactivity is high and an extended start-up procedure using a straight run feed is typically required to prevent adverse coking of the catalyst (and a concomitant reduction in catalyst efficiency). The present invention may also comprise a soft coking process that allows a controllable layer of coke to be created on the catalyst surface during or along with in situ sulfiding. The sulfiding systems disclosed above may be modified by providing a coking source, such as, but not limited to, linear alkylbenzenes, polycyclic aromatic compounds, such as, but not limited to anthracene, naphthalene, or pyrene, and other substantially unsaturated hydrocarbons useful for generating coke. Preferably during or immediately after the sulfiding process, the coking source will be injected and will react to form a coke layer on the exposed catalyst. This soft or controlled coke layer will moderate the reactivity of the catalyst and allow more rapid startup of the reactor on cracked feeds. For example, it is contemplated that sulfided and soft-coked catalysts processed according to the present inventions may only require a straight run start-up period of about 12 hours or less, including a direct start up with more highly reactive cracked feed.

The processes described above include the use of a straight run feed in addition to the sulfur source and/or the ammonia source. As the sulfiding process nears completion, it may be desirable to begin the soft coking process. The present invention contemplates injecting controllable amounts of a coking source (e.g., a reactive hydrocarbon) to create a varying or variable composite hydrocarbon feed that is more is reactive than straight run feed, but less reactive than cracked feed. It is preferred that injection of the coking source occur in conjunction with the sulfiding or sulfiding/ammoniating processes described herein, but it is also contemplated that the soft coking process can be implemented subsequent to a conventional sulfiding process, in other words, as a smart start-up procedure. The results of the soft-coking or smart start-up systems and methods described herein is to reduce the amount of time required before highly reactive, cracked feeds can be safely introduced to the reactor.

Figure 10A:
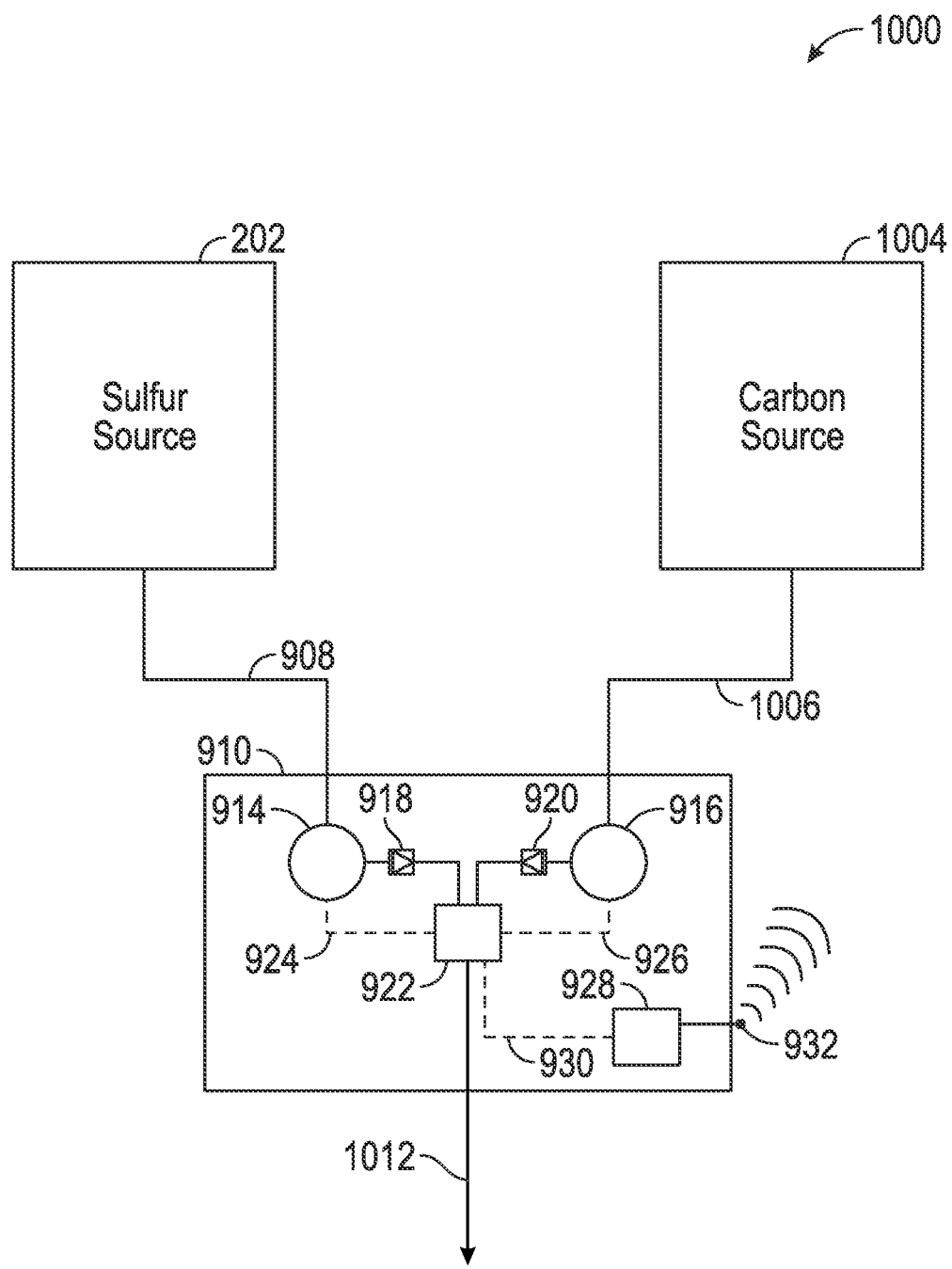
FIG. 10A illustrates a flow diagram for one of many possible combined catalyst sulfiding and soft coking system and method.

FIG. 10A illustrates one of many possible combined sulfiding and soft coking systems and methods. FIG. 10A illustrates a mixing and metering component 1000 the output 1012 of which can be fed into the sulfiding module 200 shown in FIGS. 2, 3 and 4 at input 202. As shown in FIG. 10A, a liquid coking source 1004 (naphthalene for this example) is provided in conjunction with a liquid sulfur source 202 (DMDS for this example), and, alternately, an ammonia source (not shown). The coking source 1004 is fed 1006 to a mixing station 910, and the sulfur source 202 is fed 908 to the mixing station 910. Preferably, the mixing station comprises controllable pumps 914 and 916, preferably positive displacement pumps, and a mixing manifold 922. One-way flow valves 918 and 920 may be placed between the pumps and the manifold 922 to prevent back flow. In a preferred embodiment, the mixing station 910 comprises a controller 928 or logic device that can generate and send control signals 924, 926, 930 to the pumps 914 and 916, and to controllable valving in the manifold 922, if any (not shown) to control and adjust the amount of and ratio of sulfur source and carbon source. It is also preferred that mixing station 910 be able to communicate, such as wirelessly 932, with controller 322 on sulfiding module 200.

Alternately, rather than being a separate component, the mixing/metering component 1000 may integral to the sulfiding module (e.g., module 200 in FIG. 4). Also, rather than controllable pumps 914, 916, the mixing/metering component may comprise pumps and controllable metering valves or devices.

Still further, the coking source module may comprise a module separate from the sulfiding or sulfiding/ammoniating module, and may inject the coking source directly into the straight run feed line (not shown).

Figure 10B:
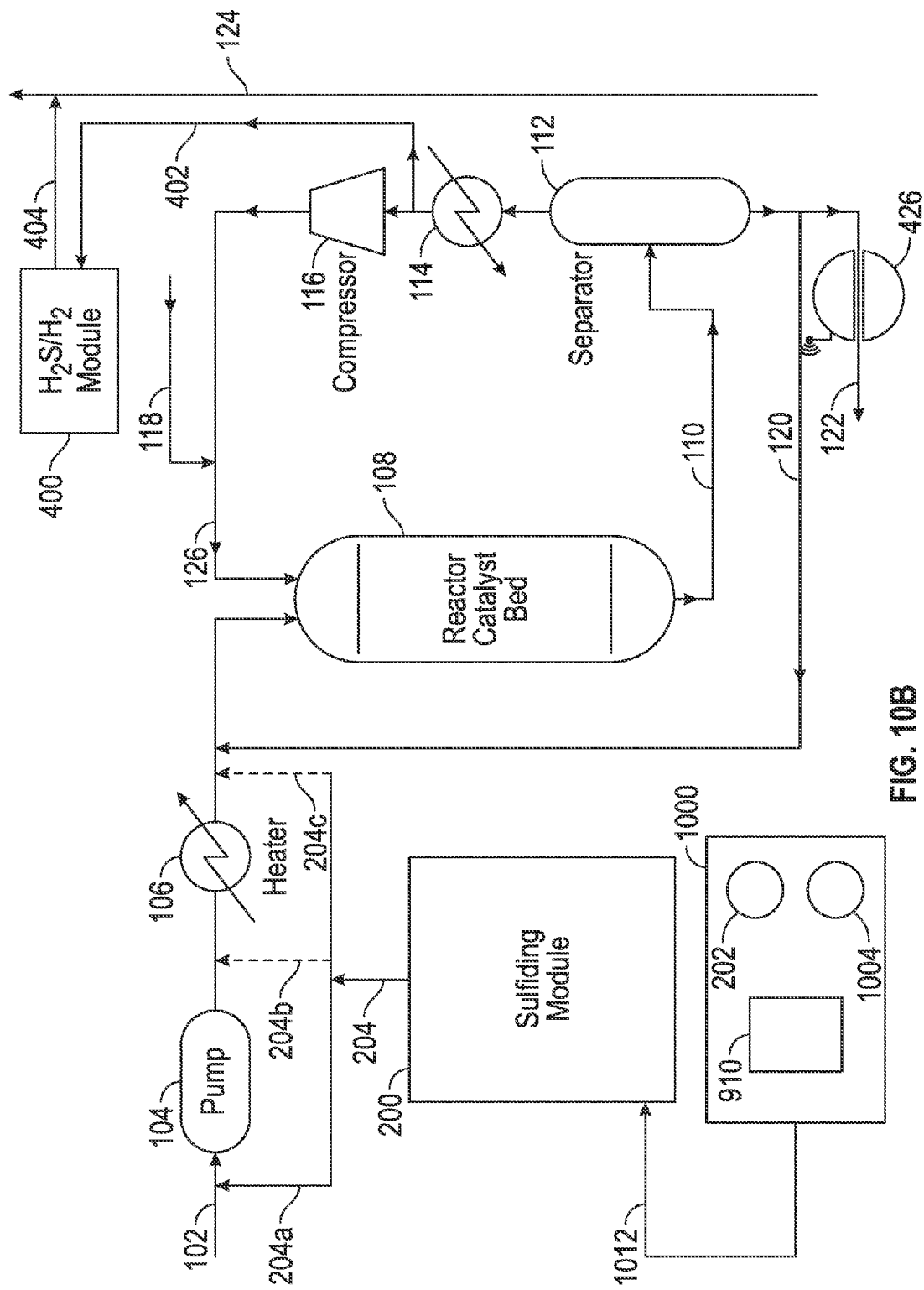
FIG. 10B illustrates a hydroprocessing unit, such as shown in FIG. 1, with sulfiding and soft coking modules.

FIG. 10B illustrates a sulfiding process, such as the process shown in FIG. 4, in conjunction with a soft coking process as described with respect to FIG. 10A. As can be seen, the liquid input to sulfiding module 200 now comprises a variable mixture of a sulfur source 202 and a carbon source 1004 as part of a mixing module 1000. It is presently preferred that the amount of soft coke deposited on the catalyst range between about 1% by catalyst weight and about 3% by catalyst weight. This has been referred to in the art as oxidic weight and includes the weight of the substrate and the weight of the metal oxide catalyst. Thus, for example, and not limitation, if the reactor contains 100,000 lbs of fresh catalyst, the carbon source 1004 must have about 1,000 lbs to about 3,000 lbs of carbon available for generation of soft coke. If it is assumed that naphthalene supplies about 50% of its Carbon content for coking purposes, then the process described herein requires at least about 2,000 to about 6,000 lbs of naphthalene to soft coke the catalyst to about 1% to about 3% weight percent.

It is contemplated that the progress of soft coking according to the present invention may be determined by monitoring the temperature profile of the catalyst bed. Because the coking process is an exothermic reaction, the temperature can be monitored to estimate or determine the amount or progress of coke deposition. It will be appreciated if coking is begun from a steady state bed temperature profile, the coking exotherm (i.e., temperature increase) will be visible as coking progresses through the bed. Based on the temperature profile of the bed, the amount of coke source may be adjusted, such as increased, decreased or stopped, to control the soft coking process.

It will be appreciated that uniform soft coking of all catalyst is rarely achieved, and is even rarely, if ever, desired. Typically, it is desired and expected that the coke will develop preferentially on the catalyst adjacent the bed inlet and the amount of coking typically will decrease with increasing distance from the bed inlet. Thus, it is contemplated that, depending on the particular reactor at issue, the temperature profile of the bed may be monitored immediately adjacent the inlet or at some distance from the inlet so that the desired amount and location of coking can be achieved. The inventions described herein can be used to adjust the location and amount of coking, such as by increasing the mass flux of coking source through the reactor and/or decreasing the coking source injection rate, which will result in coking extending farther into the bed. Conversely, decreasing the mass flux of coking source through the reactor and/or increasing the coking source injection rate will result in a more shallow coking. For example, if it is desired to soft coke the first ⅓ of the reactor bed, the temperature profile of the bed can be monitored and the soft coking process terminated, reduced or otherwise modified as the exotherm reach the ⅓ location.

As discussed above, the interface 800 also is preferably configured to control the start/stop of the mixing module pumps 914 and 916 and mixed solution or compound 912. It will be appreciated that with the systems and processes described above, a user can begin the soft coking process before, simultaneous with, or after the sulfiding process has begun. Similarly, the soft coking process can be ended (such as by discontinuing the injection of the carbon source) before, simultaneous with, or after the sulfiding process has ended. It is preferred, however, that soft coking according to the present inventions begin immediately after, or simultaneously with the completion of catalyst sulfiding. If begun after sulfiding, it may be desirable to reduce the reactor temperature, including to about 400° F., and then increase the reactor temperature to between about 500° F. and about 700° F. for coking sources, such as naphthalene or anthracene.

The soft coking systems and processes described herein allow an operator to minimize the down time of a reactor caused by catalyst regeneration or sulfiding. The soft coking processes allows the activity of fresh catalyst (or at least a portion of the fresh catalyst in the reactor) to be moderated prior much more quickly than heretofore possible, without detrimentally or unnecessarily reducing the activity of the catalyst.

Other and further embodiments utilizing one or more aspects of the inventions described above can be devised without departing from the spirit of Applicant's invention. For example, although the inventions were described primarily with liquid sulfur sources, the inventions can be used with gaseous sulfur products. Also, the interface described can allow for both manual, operator control of the equipment and automatic, preprogrammed operation. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A system for in situ treatment of a metal catalyst, comprising:
   a mobile sulfiding module comprising
      a module inlet and outlet,
      a sulfur-containing product measurement device,
      a sulfur product pressurization device having a variably controllable output,
      a nitrogen-containing product pressurization device having a variably controllable output,
      a controller in electrical communication with at least the measurement device and the sulfur and nitrogen pressurization devices, and
      a first communication device configured to transmit information between the module and an external site;
   a mobile detection module comprising
      an inlet and outlet,
      a hydrogen sulfide concentration detection device located between the inlet and outlet,
      a hydrogen gas concentration detection device located between the inlet and the outlet, and
      a second communication device configured to transmit information between the hydrogen sulfide detection device and the external site and between the hydrogen gas detection device and the external site; and
   an ammonia gas detection module having a communication device configured to transmit information between the ammonia detector detection device and the external site.

2. The system of claim 1, wherein the external site is a laptop computer.

3. The system of claim 1, wherein the external site is a website on the Internet.

4. The system of claim 1, wherein the pressurization devices comprise pumps.

5. The system of claim 4, wherein the pumps comprise AC motors and a variable frequency drives.

6. The system of claim 1, wherein at least one of the pressurization devices comprises a compressor.

7. The system of claim 6, wherein the compressor comprises an AC motor and a variable frequency drive.

8. The system of claim 1, wherein the sulfur product measurement device comprises a multi-parameter fluid measurement device.

9. The system of claim 8, wherein the fluid measurement device is configured to determine volumetric flow rate, mass flow rate, fluid density, fluid pressure and fluid temperature.

10. The system of claim 9, wherein the fluid measurement device comprises a Coriolis meter.

11. The system of claim 1, wherein the communication devices are configured to transmit information wirelessly.

12. The system of claim 11, wherein the detection module is configured to transmit information to the sulfiding module for use in controlling the output of the pressurization device.

13. The system of claim 12, wherein the detection module is configured to transmit hydrogen sulfide concentration information to the sulfiding module for use in controlling the output of the pressurization device.

14. The system of claim 11, wherein the sulfiding module and the detection module are configured to transmit information to an Internet website.

15. The system of claim 11, wherein the sulfiding module and the detection module are configured to transmit information to an Internet website for use in controlling the output of the pressurization device.

16. The system of claim 14, wherein the sulfiding module and the detection module are configured to transmit hydrogen sulfide concentration information to the Internet website and the website is configured to transmit information to the sulfiding module for use in controlling the output of the pressurization device.

17. The system of claim 1, further comprising a water detection device configured to determine an amount of water generated while treating the catalyst.

18. The system of claim 17, the water detection device comprises a removable, non-contact sensor having a third communication device configured to transmit information between the water detection device and an external site.

19. A system for liquid phase in-situ treatment of a metal catalyst, comprising:
 a sulfiding product;
 an ammoniating product;
 a coking product;
 a product supply module comprising
  a fluid measurement device comprising a Coriolis meter,
  at least one fluid pump having a variably controllable output comprising an A/C motor and a variable frequency drive,
  a product mixing component configured to receive and mix in controllable ratios the sulfiding, ammoniating and/or coking products,
  a controller in electrical communication with at least the measurement device, variable frequency drive, product mixing component, and
  a first wireless communication device configured to transmit information to and from the module;
 a hydrogen sulfide concentration detection device configured to sample a recycle gas;
 a hydrogen gas concentration detection device configured to sample the recycle gas;
 a pH meter configured to detect the pH of water; and
 a second communication device configured to transmit information among the hydrogen sulfide detection device, the hydrogen gas detection device and the pH meter and the controller.

20. The system of claim 19, further comprising an Internet website configured to receive information transmitted by the system, and to display the information received in substantially real time.

* * * * *